(12) United States Patent
Saha et al.

(10) Patent No.: US 7,849,785 B1
(45) Date of Patent: *Dec. 14, 2010

(54) DISPOSABLE COMBINED SQUEEZER/STIRRER/DISPENSER/BREWER DEVICE WITH BOTTOM CUP

(75) Inventors: Pamela Saha, 30 Bergeo Beach Pl., Brooklyn, NY (US) 11234; Fernan Luna, Barra de Carranco Caugianee (UY)

(73) Assignee: Pamela Saha, Brooklyn, NY (US)

( * ) Notice: Subject to any disclaimer, the term of this patent is extended or adjusted under 35 U.S.C. 154(b) by 415 days.

This patent is subject to a terminal disclaimer.

(21) Appl. No.: 11/900,641

(22) Filed: Sep. 12, 2007

Related U.S. Application Data

(63) Continuation-in-part of application No. 11/131,887, filed on May 18, 2005, now Pat. No. 7,591,219.

(51) Int. Cl.
*A47J 31/00* (2006.01)

(52) U.S. Cl. .......................... 99/323; 99/275; 100/211; 100/213; 100/122; 100/232

(58) Field of Classification Search .................. 99/275, 99/318, 319, 321, 349, 323, 287, 323.1, 323.2, 99/485, 495; 100/211, 122, 123, 126, 127, 100/128, 129, 131, 213, 224, 232; 15/120.1, 15/120.2, 116.1, 119.1; 426/80; *A47J 43/00*
See application file for complete search history.

(56) References Cited

U.S. PATENT DOCUMENTS

| | | | | |
|---|---|---|---|---|
| 60,060 A | * | 11/1866 | Robinson | 100/211 |
| 62,872 A | * | 3/1867 | Morton | 100/211 |
| 1,053,838 A | * | 2/1913 | Livingood | 100/123 |
| 1,281,984 A | | 10/1918 | Long | |
| 2,018,181 A | * | 10/1935 | Leo | 100/211 |
| 2,133,166 A | * | 10/1938 | Fritsche | 99/323 |
| 2,291,060 A | * | 7/1942 | Schiess | 426/82 |
| 2,986,269 A | * | 5/1961 | Goldberg | 426/80 |
| 3,935,318 A | * | 1/1976 | Mihailide | 426/80 |
| 4,211,156 A | * | 7/1980 | Zimmermann | 99/287 |
| 4,365,544 A | * | 12/1982 | Howitt | 99/297 |

(Continued)

FOREIGN PATENT DOCUMENTS

AU          0057109          11/1999

(Continued)

*Primary Examiner*—Reginald L Alexander
(74) *Attorney, Agent, or Firm*—James Creighton Wray; Meera P. Narasimhan

(57) ABSTRACT

A disposable packaging form is provided for brewed, hot drinks. The invention allows a user to brew the hot drink, squeeze out the brewed contents, and stir the contents of the hot drink. Each action can be performed multiple times before disposal. The present invention frees the user of the inconvenience of having to collect, wash, or dispose of the stirrers, squeezers and bags of the hot drink individually. A beverage apparatus has a rigid rod, a first manipulator connected to the rigid rod near the top of the rigid rod, and a second manipulator connected to the rigid rod near a bottom end of the rigid rod, a porous enclosure material, and beverage brewing contents within the enclosure. The second manipulator is a bottom cup and may be made as one unit with the rigid rod, serve as a stand, or serve as a caddy for a tea bag.

3 Claims, 25 Drawing Sheets

U.S. PATENT DOCUMENTS

| | | | |
|---|---|---|---|
| 4,410,550 A * | 10/1983 | Gaskill | 426/80 |
| 4,717,016 A * | 1/1988 | Dalgleish | 206/0.5 |
| 4,806,369 A | 2/1989 | Thompson | |
| 4,826,695 A * | 5/1989 | Tanner | 426/77 |
| 4,844,914 A * | 7/1989 | Bonne et al. | 426/79 |
| 5,335,591 A | 8/1994 | Pozar | |
| 5,566,417 A * | 10/1996 | Hsieh | 15/120.2 |
| 5,775,205 A | 7/1998 | Melton | |
| 5,806,409 A | 9/1998 | Johnson et al. | |
| 5,809,868 A | 9/1998 | Milone | |
| 5,887,510 A * | 3/1999 | Porter | 99/287 |
| 5,913,964 A | 6/1999 | Melton | |
| 5,937,737 A * | 8/1999 | Karell | 99/287 |
| 5,952,028 A | 9/1999 | Lesser | |
| 5,996,473 A | 12/1999 | Milone | |
| 6,007,853 A | 12/1999 | Lesser | |
| 6,038,963 A | 3/2000 | Patterson et al. | |
| 6,058,549 A * | 5/2000 | Milward-Bason | 15/120.1 |
| 6,481,338 B1 | 11/2002 | Wai | |
| 6,684,756 B2 * | 2/2004 | Kerr | 99/297 |
| 7,051,648 B2 * | 5/2006 | Fenaroli | 99/321 |
| 7,437,990 B2 * | 10/2008 | Duch | 99/297 |
| 7,591,219 B2 * | 9/2009 | Saha | 99/323 |
| 2003/0000036 A1 | 1/2003 | Fan | 15/120.1 |
| 2005/0263006 A1 * | 12/2005 | Saha | 99/275 |

FOREIGN PATENT DOCUMENTS

| | | |
|---|---|---|
| DE | 1795868 | 9/1959 |
| GB | 2057902 | 4/1981 |
| GB | 2214785 | 9/1989 |
| JP | 02/369749 | 12/2002 |

\* cited by examiner

187

189

191

193

195  197

DISPOSABLE COMBINED SQUEEZER/STIRRER/DISPENSER/BREWER DEVICE WITH BOTTOM CUP

This application is a continuation-in-part of application Ser. No. 11/131,887, filed May 18, 2005 now U.S. Pat. No. 7,591,219.

BACKGROUND OF THE INVENTION

Tea and coffee bags are extensively used for quick brewing of tea and coffee. Methods exist for making cups of tea, coffee or other beverages with both disposable and non-disposable devices. Many of the current devices are non-disposable, requiring a user to clean and store them between uses. These devices are inconvenient for beverages consumed outside the home. Other existing devices are disposable, but may only be used for one serving of beverage. This is inconvenient for tea, coffee or other drinks that utilize bags that are usable more than once at a sitting. Additionally, for both disposable and non-disposable devices, several independent devices are required to make a cup of a beverage, such as a squeezer, stirrer, dispenser and a brewer. Each device operates independently.

Some examples of current systems include disposable stirrers, disposable cups, and individually wrapped cream and sugar packets. Other devices are drawstrings incorporated into tea bags for facilitating squeezing after brewing. Non-disposable brewing bag squeezers are also available. None of these methods provide a simple, all in one device for brewing beverages.

Needs exist for disposable devices that are reusable for multiple times in one sitting and allow the user to perform all necessary actions with a single device.

SUMMARY OF THE INVENTION

The present invention is a disposable packaging form for brewed, hot drinks. The invention allows a user to brew the hot drink, squeeze out the brewed contents, and stir the contents of the hot drink. Each action can be performed multiple times before disposal. In some embodiments, the device of the present invention dispenses sweeteners, creamers, flavorings and condiments. The present invention frees the user of the inconvenience of having to collect, wash, or dispose of the stirrers, squeezers and bags of the hot drink individually.

A preferred embodiment is made of a biodegradable material such as plant material in the grass or bamboo category. The biodegradable material envelops beverage brewing components in a porous structure encircling a rigid rod. The rigid rod is manually or mechanically manipulated to facilitate squeezing as well as relaxation of squeezing. In general, a device may be compressed by being pushed downward, pulled upward or twisted. The rigid rod also facilitates stirring and may be hollow and/or partially porous. Sweeteners, creamers or condiments may be stored in the hollow and partially porous rigid rod. These sweeteners, creamers or condiments may be blown out of the rigid rod by a user or may seep through the rigid rod by osmosis. Sweeteners, creamers and/or condiments may be dispensed in other locations within or on the invention besides the rigid rod. The rigid rod may operate like a syringe to control release of substances.

The device of the present invention may be enclosed in a package that opens and unfolds in a manner that provides a stand or holder for containing the device for reuse or simply to prevent messes prior to disposal. Part of the package may unfold into a cup. This embodiment only requires the user to obtain hot water. Or, the user may heat water within the cup.

These features would be useful for a variety of applications, including military applications. It would provide sanitary, convenient and biodegradable disposable devices for use in the field with less environmental impact than non-biodegradable materials with more components.

Other embodiments are possible. A solid piece of plastic with pores for forming a porous film of plastic material with ribbing may be provided around a stirring rod. The ribbing adds structure and control. The device is capped with ribbed and thickened cup-like portions that fan out, contract and have some rigidity during use. The cup-like portions have central holes for placement of the stirring rod. The top cup-like portion is not porous. The bottom cup-like portion has larger holes than the holes on the porous film. The porous film holds tea leaves or coffee grounds and keeps dust inside the porous film. Water is allowed to penetrate and flow through the porous film.

The stirring rod may be a hollow shaft that may contain creamer, sweetener, or other flavorings. A small rod is located inside the hollow shaft. Projections from the small rod depress a spring when they are pressed downward. The spring pushes up on and pulls a disc structure upward to close an opening. The disc structure may have a weighted protrusion for adding weight to the overall device to keep the buoyant bag from floating. The opening allows contents of the hollow shaft to dispense when the small rod is moved downward. The downward movement causes the projections to move downward and compress the spring, thus moving the disc structure away from the opening. A button covering allows a user to press downward on the small rod. A closure encircles the area of insertion of the button covering on the top of the hollow shaft.

A syringe or other device for injecting cream, sweetener or other flavorings into the hollow shaft through a hole may be used. After injection, the button covering is inserted into an opening in the top of the hollow shaft.

Alternatively, the stirring rod is a hollow rod that may be filled with desired ingredients and capped at both ends with removable foil and blown out from the top end by the user. It may also be capped with a substance dissolvable in water freeing its contents during use, or pinched at the ends such that applying pressure with the user's hand opens the stirring rod.

In another embodiment, a stirrer is made of for example, but not limited to, wooden sticks or bamboo shoots or any other suitable material. A bag is attached to the stirrer. Protrusions from the stirrer are created by molding if the stirrer is plastic, carved out of the wood or bamboo, or otherwise attached to the stirrer shaft. The protrusions hold and support the bag. In some preferred embodiments, the protrusions may enclose and squeeze the bag manually, with a string or some other device.

In an alternative embodiment, the device has extended panels hinged at one end. A bag is attached to the extended panels at an end opposite to the hinged end. A user exerts force to squeeze the extended panels together and thus squeeze the bag. In preferred embodiments, a straw or other device is incorporated for dispensing other flavorings.

Many variations on the basic design are available. The package may include an all in one tea or coffee services by placing the device within a capped cylindrical stand, flexible or rigid, containing or wrapped with a doily, napkin and a folded cup. Flavorings, sweeteners, condiments or creamers may be packaged within the capped cylindrical stand or packaged around it. The device may be sold individually in capped cylindrical stands or in boxed quantities. The cap may be modified into a container for substances to be dispensed. The present invention may be sold with any combination of items or packaging forms.

In other preferred embodiments of a combined squeezer/stirrer/dispenser/brewer device, attachments are attached to a rigid shaft and movable up and down the shaft. The attachments may have a rounded, conical, spindle or other shape. The attachments are connected to the shaft at slideable connectors and are held in place by friction. Bags are loosely attached to the shaft between the attachments. Knobs may be included to prevent the attachments from moving off the ends of the rigid shaft.

Moving the attachments towards each other along the shaft operates the device. Rotating the attachments in opposite directions or rotating one attachment while the other remains fixed may also perform squeezing if the bag is also fixed to the attachments that slide along the shaft. The device is uncompressed by moving the attachments in an opposite direction.

A ratchet may be included for added force, control, fixation and precision.

In another embodiment, multiple bag-like receptacles extend from a ring structure at an upper portion of the shaft to a lower portion of the shaft. Rotating the ring in one direction compresses the receptacles around the shaft surfaces. Rotating the ring in the opposite direction uncompresses the receptacles.

Another embodiment utilizes flaps that extend from the top of the shaft and provide another means for avoiding liquid squeezed out during use. Pressure is applied to the flaps and the flaps move and compress a brewing device.

Another embodiment includes panels incorporated in or on the brewing bag of the device. Squeezing the panels together compresses the device. Releasing the panels relaxes the brewing device.

The brewing device may also be comprised of batting or other spongy/fibrous material between porous mesh material.

Another embodiment is a stirrer and dispenser without the squeezing and brewing mechanism that is useful for both hot and cold drinks. This device includes a rigid hollow shaft with plugs on one or both ends of the shaft. The plugs may be divided. There may be one or more horizontal or vertical partitions dividing the shaft into compartments for containing various items for dispensing. Dispensable items may include, but are not limited to, flavorings for hot or cold beverages, and ingredients for adding to water, milk, alcohol, juices, punches, or other base liquid substances to create a drink or to add to a drink. As an example, alcohol may be dispensed into a beverage, such as coffee or tea. The device may also dispense medications, vitamins, or other substances/additives such as nicotine to reduce smoking in public places or around family at home and to assist in smoking cessation.

In one embodiment a new beverage apparatus has a rigid rod, a first manipulator connected to the rigid rod near a top end of the rigid rod, and a second manipulator connected to the rigid rod near a bottom end of the rigid rod. A porous material between the first manipulator and second manipulator forms an enclosure. Beverage brewing contents are within the enclosure. Twisting, compressing the first manipulator towards the second manipulator or pulling the first manipulator away from the second manipulator expels water from the enclosure. The second manipulator is a bottom cup and is made as one unit with the rigid rod.

In one embodiment a new beverage apparatus has a rigid rod, a first manipulator connected to the rigid rod near a top end of the rigid rod, and a second manipulator connected to the rigid rod near a bottom end of the rigid rod. A porous material between the first manipulator and second manipulator forms an enclosure. Beverage brewing contents are within the enclosure. Twisting, compressing the first manipulator towards the second manipulator or pulling the first manipulator away from the second manipulator expels water from the enclosure. The second manipulator is a bottom cup and serves as a stand.

In one embodiment a new beverage apparatus has a rigid rod, a first manipulator connected to the rigid rod near a top end of the rigid rod, and a second manipulator connected to the rigid rod near a bottom end of the rigid rod. A porous material between the first manipulator and second manipulator forms an enclosure. Beverage brewing contents are within the enclosure. Twisting, compressing the first manipulator towards the second manipulator or pulling the first manipulator away from the second manipulator expels water from the enclosure. The second manipulator is a bottom cup and serves as a caddy for a tea bag.

In addition to the devices of the present invention being biodegradable and disposable, each of the devices may be formulated to be edible in part or as a whole.

While the preferred embodiment of the present invention is for brewed beverages, both disposable and non-disposable variations, biodegradable and non-biodegradable variations of the design may be used for squeezing out fluid, moisture, water or other substances, such as the removal of water from the whey of milk, as well as brewing hot drinks.

Toy versions of the above devices using herbal teas, chocolate, dried fruit, or other substitutes can allow children to playfully imitate adults.

These and further and other objects and features of the invention are apparent in the disclosure, which includes the above and ongoing written specification, with the drawings.

DETAILED DESCRIPTION OF THE PREFERRED EMBODIMENTS

The present invention is a disposable packaging form for brewed, hot drinks. The invention allows a user to brew the hot drink, squeeze out the brewed contents, and stir the contents of the hot drink. Each action can be performed multiple times before disposal. In some embodiments, the device of the present invention dispenses sweeteners, creamers, flavorings and condiments. The present invention frees the user of the inconvenience of having to collect, wash, or dispose of the stirrers, squeezers and bags of the hot drink individually.

Figure 1:
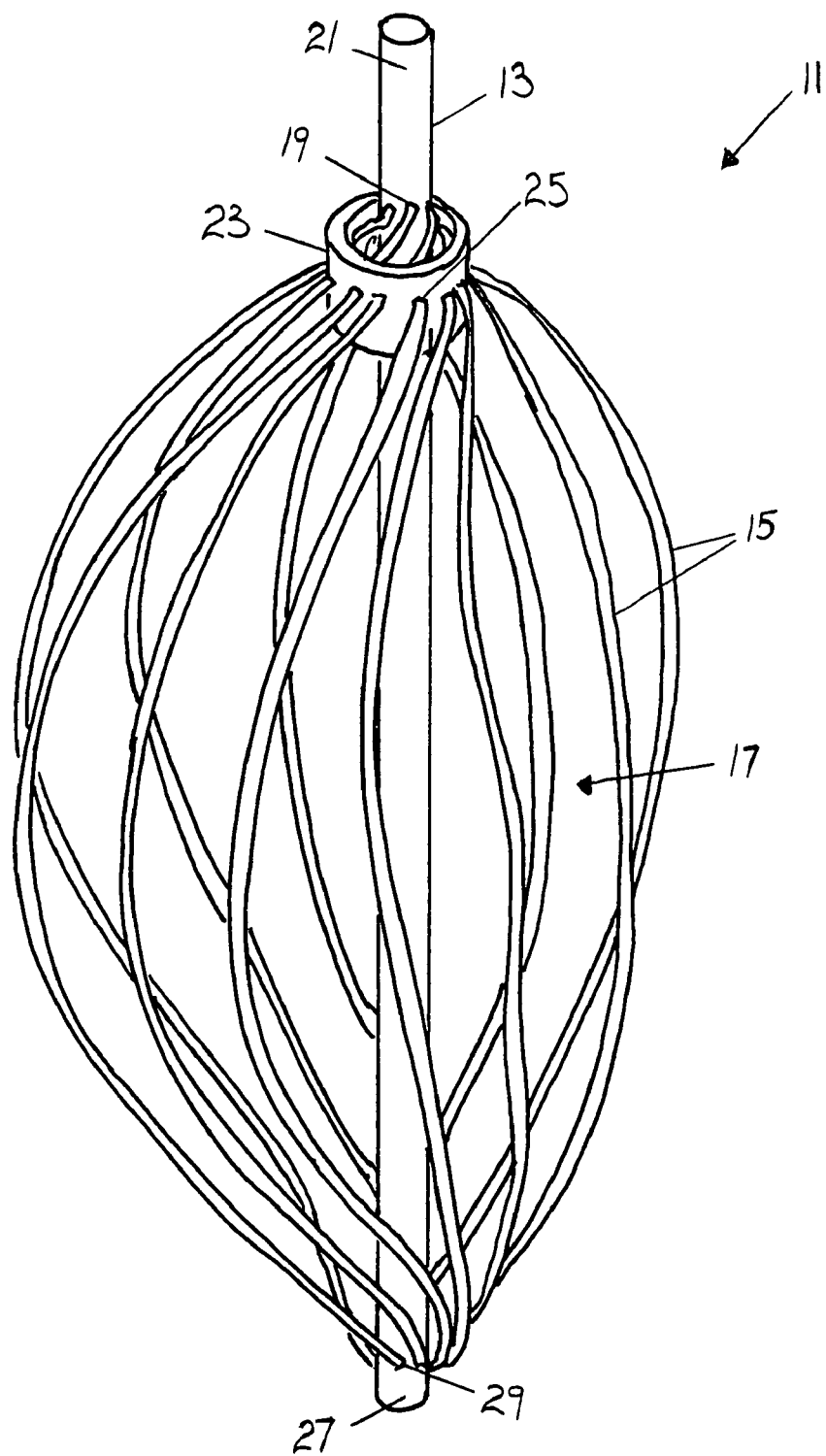
FIG. 1 is a perspective view of the disposable device in a relaxed position.

FIG. 1 shows a preferred embodiment of the present invention. The device 11 is generally made of but not restricted to biodegradable materials, such as plant material in the grass or bamboo category. It may be made of plastic or other suitable material. A rigid rod 13 acts as a base member for the device 11. The rigid rod 13 facilitates stirring of a beverage and may be hollow and/or partially porous. Sweeteners, creamers and/or condiments may be stored in the hollow and/or partially porous rigid rod 13. These sweeteners, creamers and/or condiments may be blown out of the rigid rod 13 by a user or may seep through the rigid rod 13 by osmosis. Fibers, nets, a series of spindly attachments, porous sheet material 15 or any combination of these biodegradable material envelop beverage brewing contents in a porous structure 17 encircling the rigid rod 13. The fibers or sheets 15 may enclose additional bag-like structures or the brewing contents may be sufficiently contained with the fibers 15 that no additional containment is needed. Sweeteners, creamers and/or condiments may be dispensed from the porous structure 17 or from other locations within or on the device 11 besides the rigid rod 13 and porous structure 17.

The fibers or sheets 15 are attached 19 to the rigid rod 13 at the top end 21 of the rigid rod 13. The fibers or sheets 15 may be glued or otherwise attached to the rigid rod 13 at the attachment points 19. Near the top end 21 of the rigid rod 13, the fibers or sheets 15 pass through 25 a ring or other similar device 23. The fibers or sheets 15 hold the ring 23 in place via friction between the fibers or sheets 15 and the ring 23. Alternatively, the ring 23 may be held in place via friction between the ring and the rigid rod 13 and the fibers or sheets may be directly attached to the ring 23. The fibers or sheets 15 then attach to a bottom end 27 of the rigid rod 13 at attachment points 29.

To operate the device 11, the rigid rod 13 is manually or mechanically manipulated to facilitate squeezing as well as relaxation of squeezing. The user rotates the ring 23 in a plane perpendicular to the rigid rod 13. Rotation of the ring 23 in one direction increases squeezing, while rotation in the opposite direction releases tension.

Figure 2:
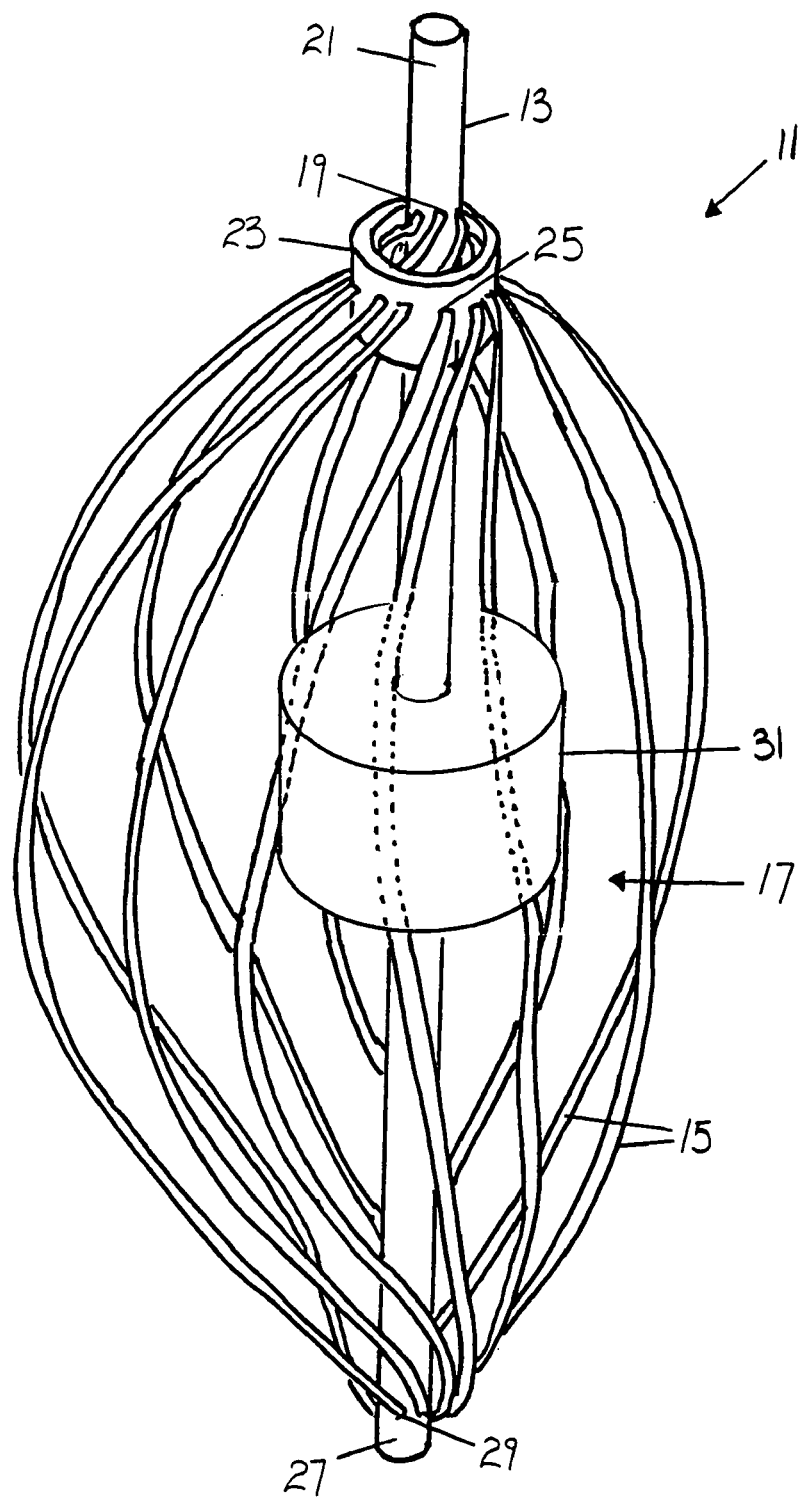
FIG. 2 is a perspective view of the disposable device with a beverage bag.

FIG. 2 shows the same device 11 as FIG. 1, but with an additional bag 31 containing brewing contents and/or sweeteners, creamers, flavorings, condiments, or related materials. The bag 31 may be free floating within the porous structure 17 or the bag 31 may be wrapped around the rigid rod 13. The device 11 operates in the same manner as in FIG. 1.

Figure 3:
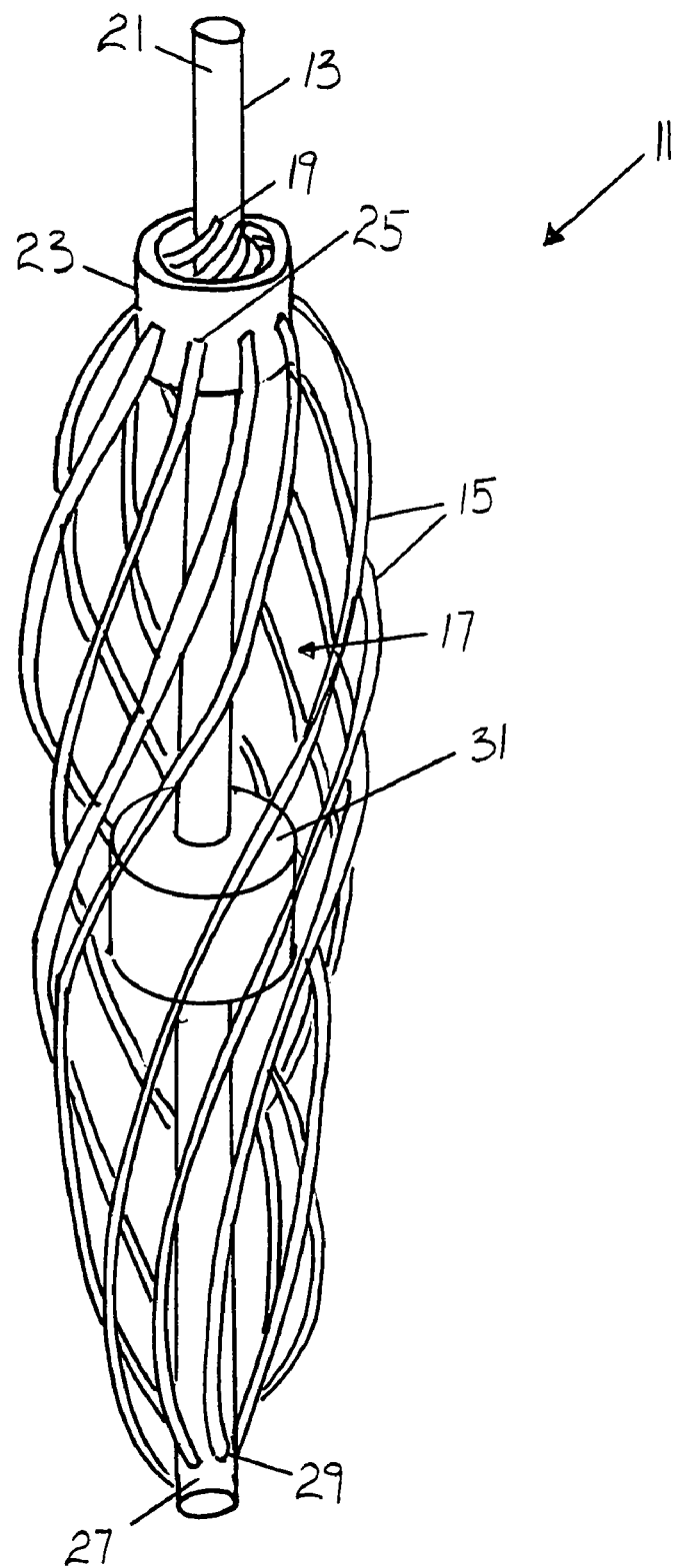
FIG. 3 is a perspective view of the disposable device in a compressed position.

FIG. 3 shows the device 11 in a compressed position. The ring 23 has been rotated such that the bag 31 is compressed and the desired brewing contents have been expelled, while undesired contents, such as tea leaves, are retained. The device 11 will be ready for subsequent brewing by releasing the tension on the ring 23 and turning the ring 23 in the opposite direction. This will cause the device 11 to return to a relaxed configuration.

Figure 4:
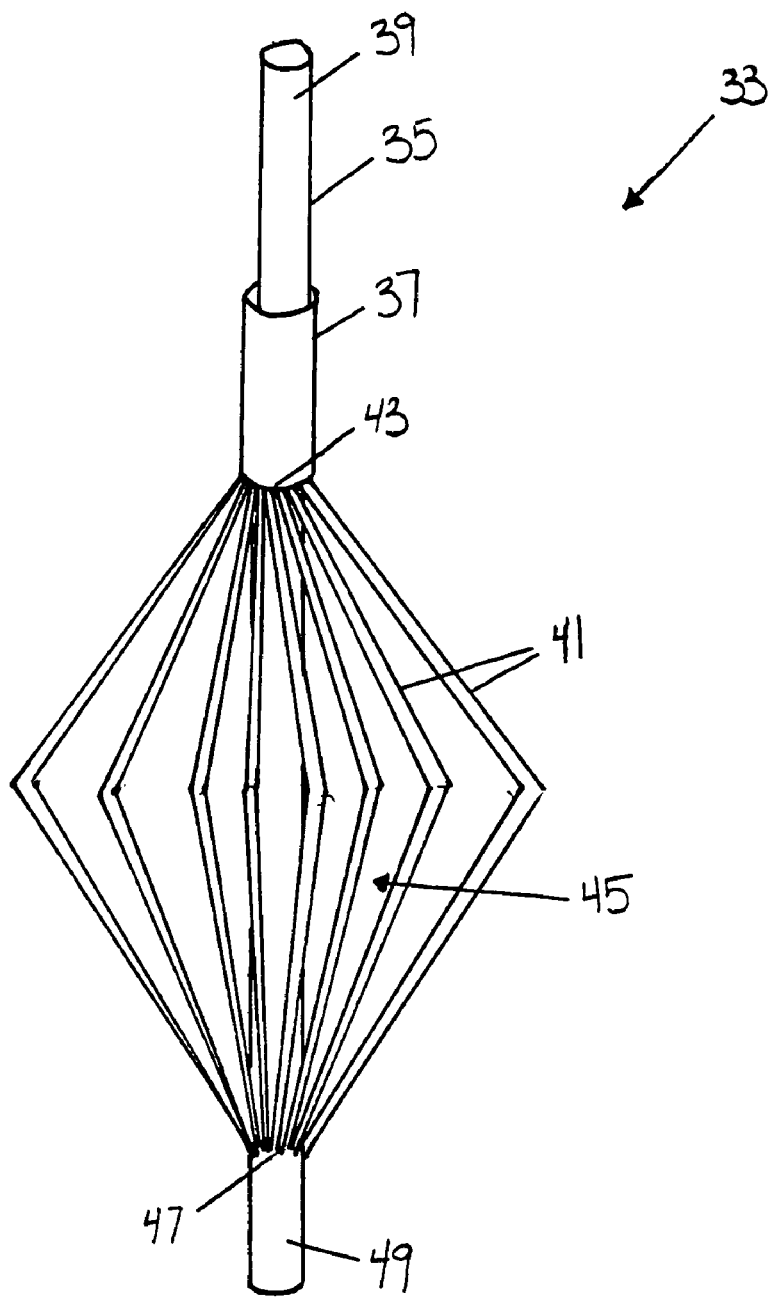
FIG. 4 is a perspective view of an angular disposable device.

FIG. 4 shows another embodiment of the device 33. A central rigid rod 35 forms the basis for the device 33. A tube-like ring 37 encircles the rigid rod 35 near the top 39 of the rigid rod 35. The tube-like ring 37 rotates in a plane perpendicular to the rigid rod 35. Additionally, the tube-like ring 37 moves up and down the rigid rod 35. Fibers, nets, a series of spindly attachments, porous sheet material 41 or any combination thereof 41 are attached to a base 43 of the tube-like ring 37. The spindles 41 extend downward from the base 43 of the tube-like ring 37 and create an enclosure 45 for holding the brewing contents between the spindles 41 and the rigid rod 35. Alternatively, the brewing contents may be held in a separate bag 51, shown in FIG. 5, within the enclosure 45. The spindles 41 then attach 47 to the rigid rod 35 near the base 49 of the rigid rod 35.

To operate this device 33, the tube-like ring 37 is pressed in a downward direction along the rigid rod 35. This causes the spindles 41 to be compressed or squeezed in a horizontal plane perpendicular to the rigid rod 35. The device 33 will be ready for subsequent brewing by releasing the tension on the tube-like ring 37 and pulling the tube-like ring 37 upward, in the opposite direction. This will cause the device 33 to return to a relaxed configuration. This device 33 may also be compressed in a manner similar to that in FIG. 3 by rotating the tube-like ring 37 around the rigid rod 35. The tube-like ring 37 may also be pulled further upward to collapse the spindles 41 toward the rod against the brewing contents. This compresses the brewing contents.

Figure 5:
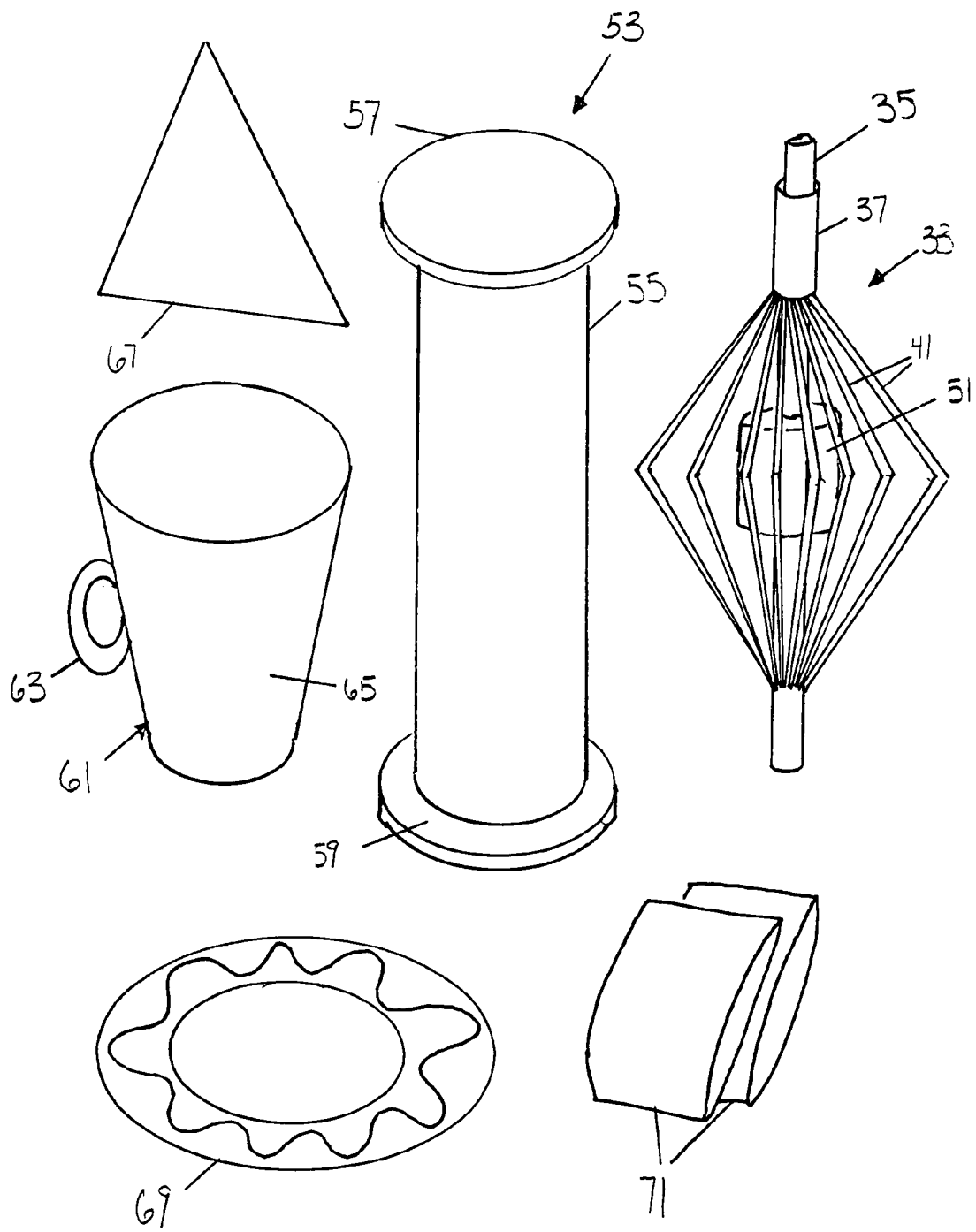
FIG. 5 shows a packaging device and components of within the packaging.

As shown in FIG. 5, the devices 11, 33 as well as other embodiments of the present invention may be enclosed in a package 53 that opens and unfolds in a manner that provides an all in one tea or coffee service. The devices 11, 33 of the present invention may be placed inside the package 53. The package consists of a rigid or flexible container 55, with or without a cap 57 for the container 55. The container 55 may also have a base 59 for standing the package 53 in a vertical position. The container 55 is used as a standing receptacle for holding the devices 11, 33 for reuse or in preparation for discarding the devices 11, 33 as well as other items. The container 55 may be made of bamboo or other biodegradable or non-biodegradable materials. The container 55 may be cylindrical or another shape.

Other items may also be included in the package 53. A disposable cup 61 is able to hold hot liquids. The cup 61 may or may not have handles 63. The handles 63 may be folded flush with the outer surface 65 of the cup 61. Additionally, the container 55 may serve as the cup for this embodiment. The container 55 should be able to hold hot liquids. Other items that may be included in the package 53 are napkins 67, doilies 69 or accessory packages 71. The napkins 67 or doilies may be folded and placed inside the container 55 or wrapped around the outside of the container 55. The accessory packages 71 may be sweetener, creamer, condiments, flavorings or related materials. All items are preferably made from but not restricted to biodegradable materials. One, all, or any combination of the items in FIG. 5 may be packaged as individual products or in boxed quantities.

The package 53 acts as a stand or holder for containing the device 11, 33 for reuse or simply to prevent messes prior to disposal. Part of the package 53 may unfold into a cup 61. This only requires the user to obtain hot water. Alternatively, the user may heat water within the cup 61. These features would be useful for a variety of applications, including military applications. It would provide sanitary, convenient and biodegradable disposable devices for use in the field with less environmental impact than non-biodegradable materials with more components.

Figure 6:
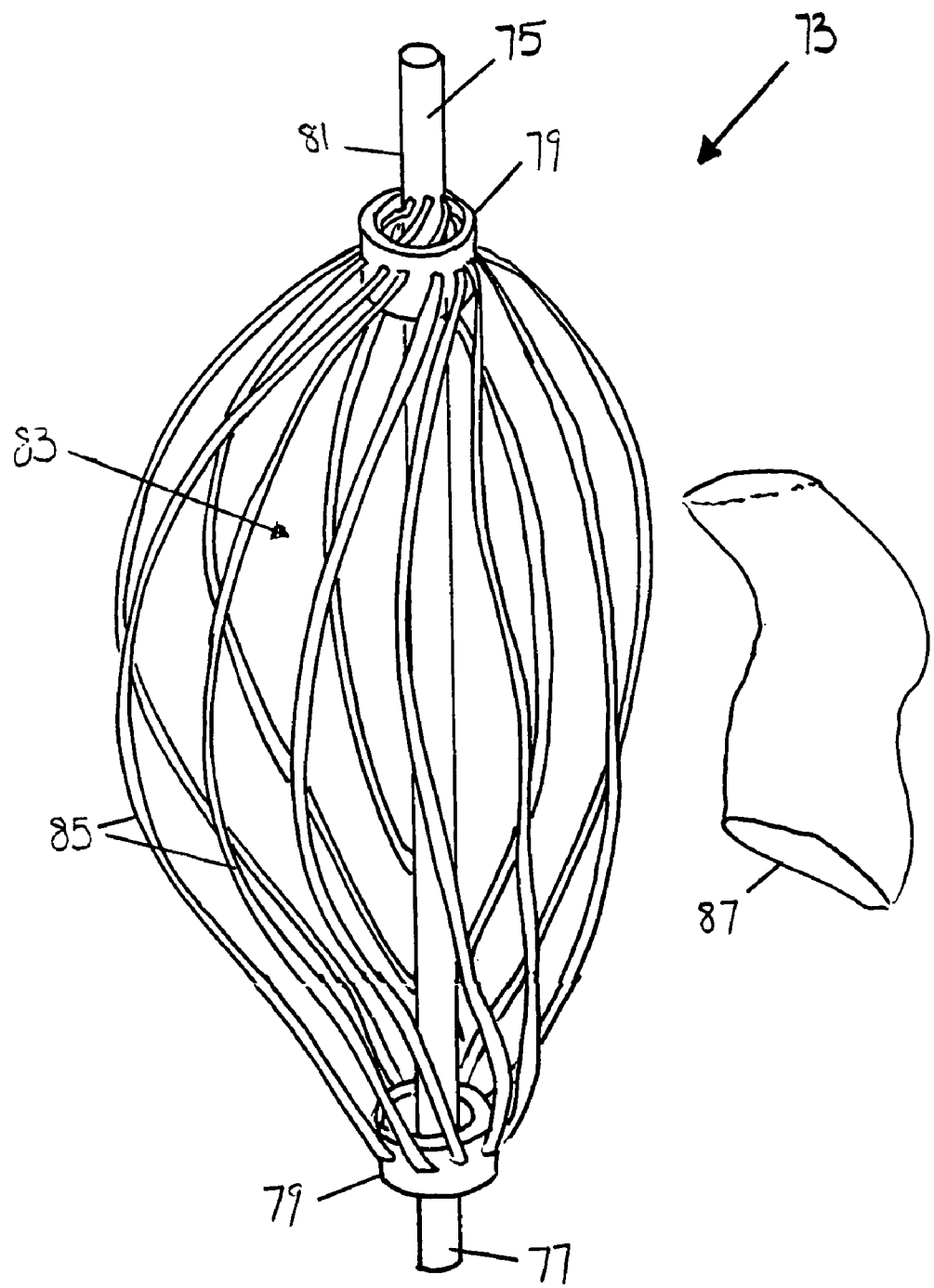
FIG. 6 is a perspective view of the device used for removing liquid from an object.

FIG. 6 shows an alternative use of the present invention. While the preferred embodiment of the present invention is for brewed beverages, both disposable and non-disposable variations of the design may be used for squeezing out fluid, moisture, water or other substances, such as the removal of water from the whey of milk. In this embodiment of the device 73, one or both ends 75, 77 of a rigid rod 81 of the device 73 may have ring structures 79. These ring structures 79 act in a similar manner to other embodiments. The rings 79 may be enhanced with motors, wrench or ratchet-like structures for added force, control, fixation and precision. The rigid shaft 81, around which the rings 79 rotate, facilitates the spindle action that results in the squeezing action of the contents of an enclosure 83. The spindle-like structures 85 surround a net-like structure or a porous sheet-like container. The rings 79 are rotated in a plane perpendicular to the shaft 81. One or both of the rings 79 may be rotated. To compress the spindles 85, the rings 79 are rotated in opposite directions. To release tension, the rotations are reversed. A cheese or whey bag 87 is placed in cheesecloth or other porous bags or sheets and wrapped around the shaft 81 inside of the spindles 85.

Figure 7:
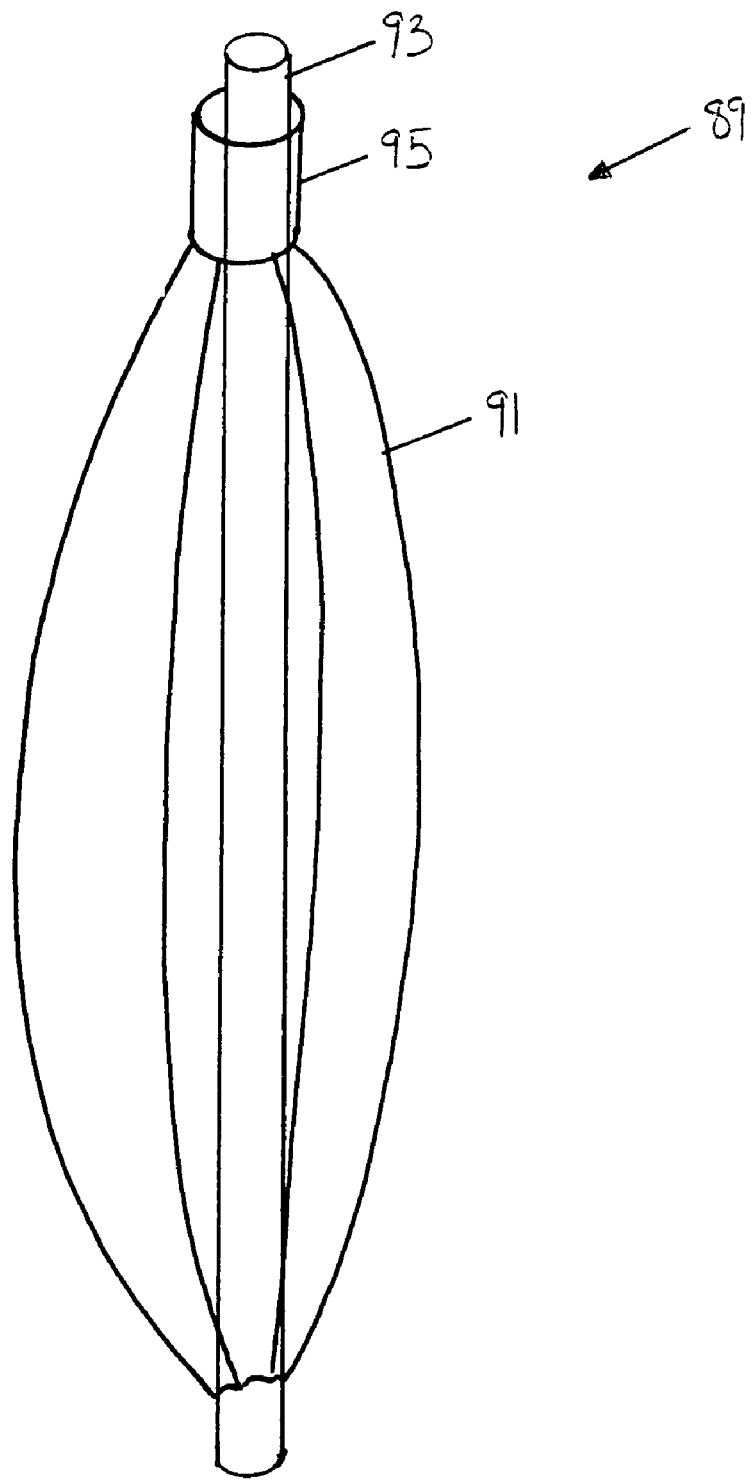
FIG. 7 is a perspective view of the device with a bag attachment.

FIG. 7 shows an embodiment of the device 89 using a bag 91. The bag 91 is a long, cylindrical, porous bag-like structure containing brewing contents, such as tea leaves or coffee grounds. The bag 91 is wrapped around a central shaft 93. Bag 91 is attached to ring 95 and shaft 93.

Figure 8:
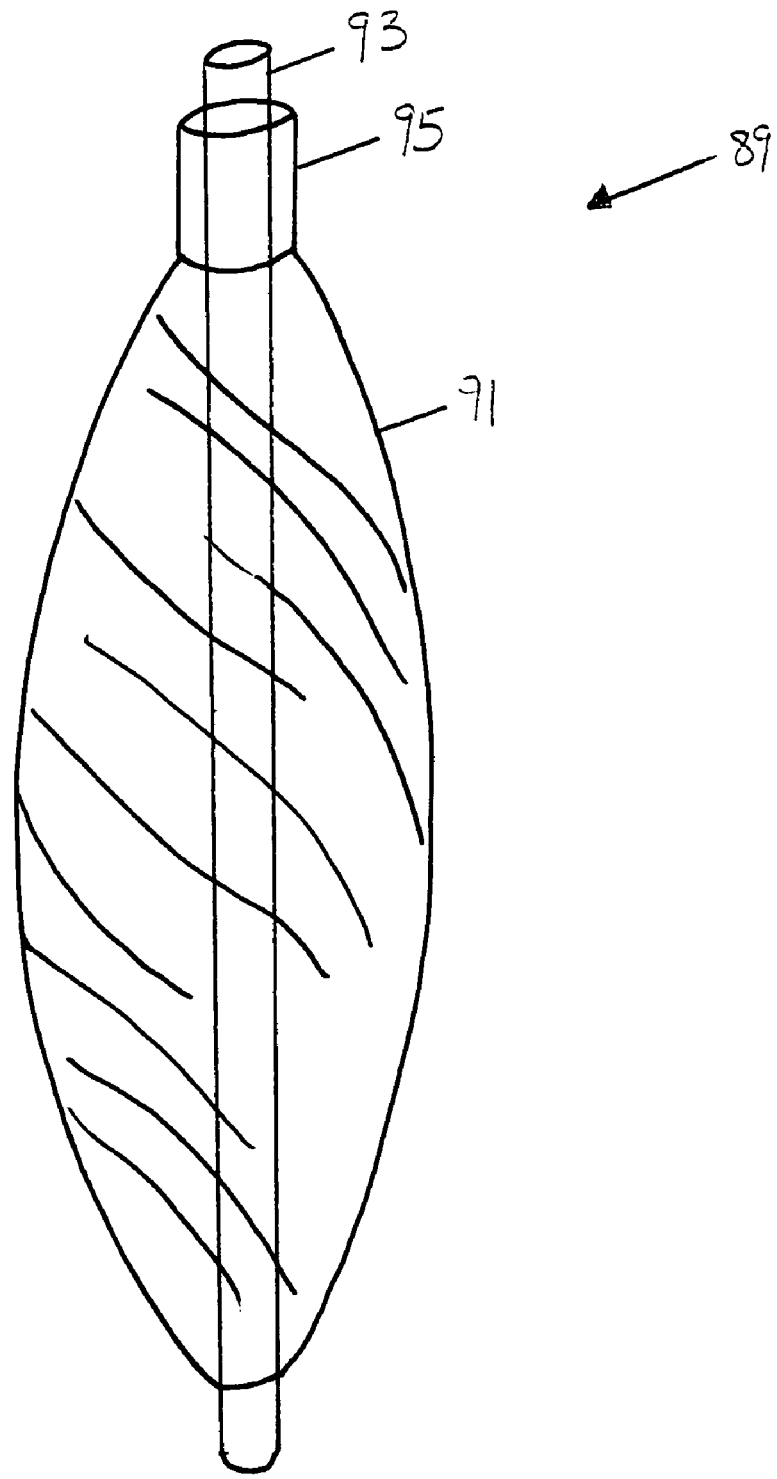
FIG. 8 is a perspective view of the device with a bag attachment in a compressed position.

FIG. 8 shows the device 89 with a bag 91 twisted around the shaft 93 and squeezing the contents of the bag 91. The squeezing action is similar to the squeezing action described for other embodiments. A user grips a ring 95 and rotates the ring 95 until the desired squeezing is complete. The process is reversed to release tension.

Figure 9:
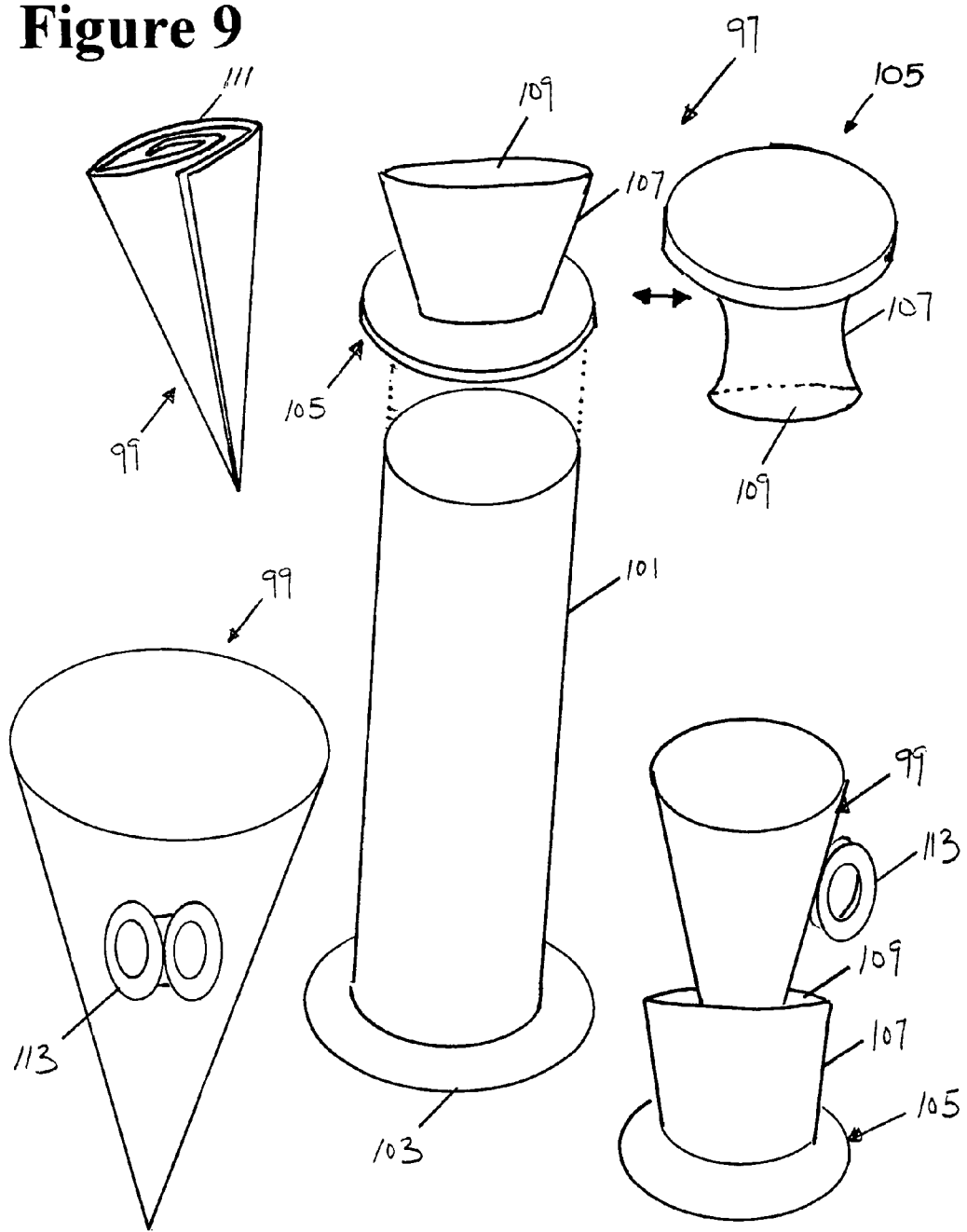
FIG. 9 shows components of a complete beverage package with a collapsible cup.

FIG. 9 shows a package 97 with a collapsible cup 99. The package 97 consists of a container 101 with a base 103. The container 101 is free standing. A cap 105 for the container 101 acts as a stand 107 for the collapsible cup 99. The cup 99 may be a variety of shapes, but is preferably a cone shape. The cap 105 may be attached to the container 101 so that the mouth 109 of the stand 107 protrudes outward from the container 101 or so that the mouth 109 of the stand 107 is closed within the container 101. The cup 99 may be rolled 111 or folded to fit within the container 101. The cup 99 may also have handles 113 that fold outward. In another embodiment the cap may be modified into a bottle like attachment to contain an alcoholic (i.e. for a hot toddy) or other additive for the brewed drink.

Figure 10:
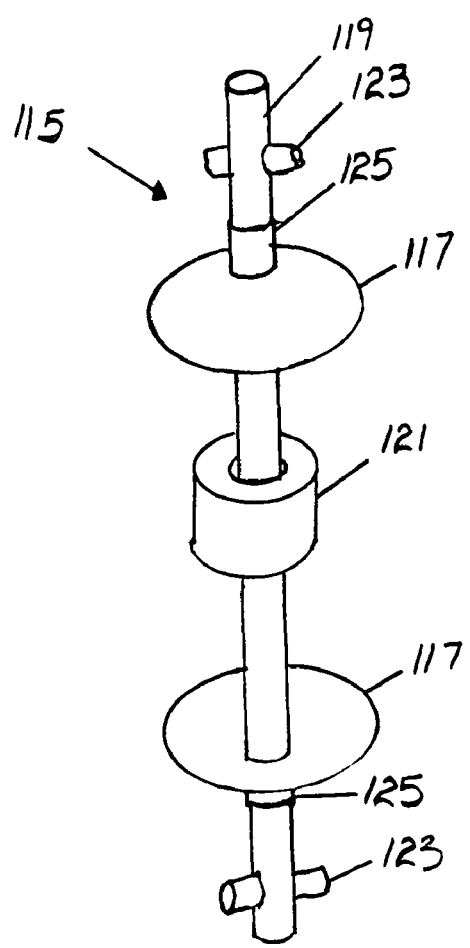
FIG. 10 is a perspective view of the device with round attachments movable up and down the shaft.

FIG. 10 is another preferred embodiment of a combined squeezer/stirrer/dispenser/brewer device 115 with rounded attachments 117 attached to and movable up and down a shaft 119. The rounded attachments 117 are connected to the shaft 119 at slideable connectors 125. The rigid shaft 119 is used for stirring a beverage and holding a bag 121 of brewing contents in place. The bag 121 is loosely attached to the shaft 119 to facilitate movement along the shaft 119. Knobs 123 may be included to assist the user in brewing the contents. The knobs 123 prevent the attachments 117 from moving off the ends of the rigid shaft 119.

Figure 11:
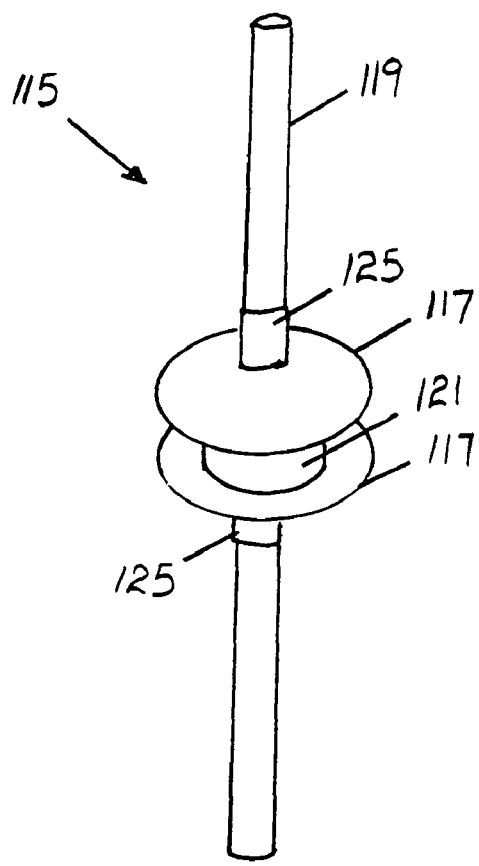
FIG. 11 is a perspective view of the device of FIG. 10 in a compressed state.

FIG. 11 shows the device 115 of FIG. 10 in a compressed state. The rounded attachments 117 have been moved towards one another, thereby compressing the contents of the bag 121.

Figure 12:
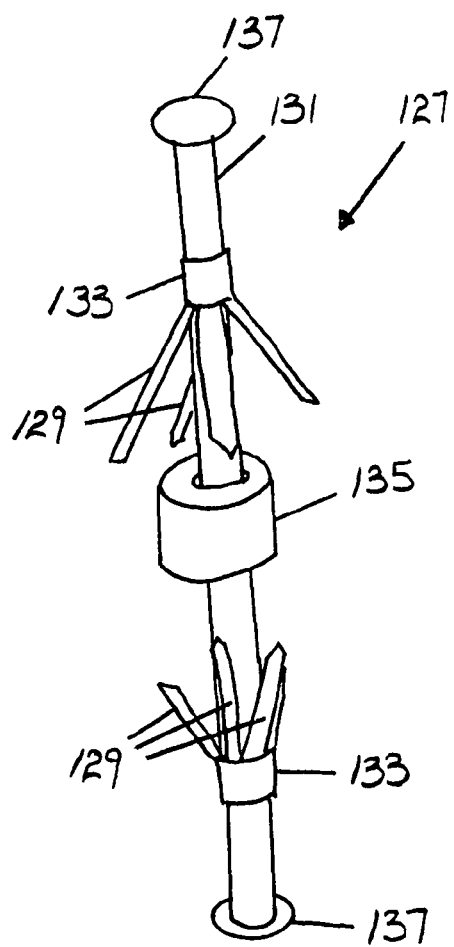
FIG. 12 is a perspective view of the device with spindle attachments movable up and down the shaft.

FIG. 12 is another preferred embodiment of a combined squeezer/stirrer/dispenser/brewer device 127 with spindle attachments 129 movable up and down a shaft 131. The spindle attachments 129 are connected to the shaft 131 at slideable connectors 133. The rigid shaft 131 is used for stirring a beverage and holding a bag 135 of brewing contents in place. The bag 135 is loosely attached to the shaft 131 to facilitate movement along the shaft 131. Ends 137 may be included to hold the apparatus 127 upright when not in use and to prevent the slideable connectors 133 and attachments 129 from moving off the shaft 131. Ends 137 may also serve as stoppers that may be removed to allow contents such as flavorings, creamers, sweeteners, condiments, herbs, alcohol, medicinal, and legally dispensable mind altering substances such as a nicotine based substance to be released.

Figure 13:
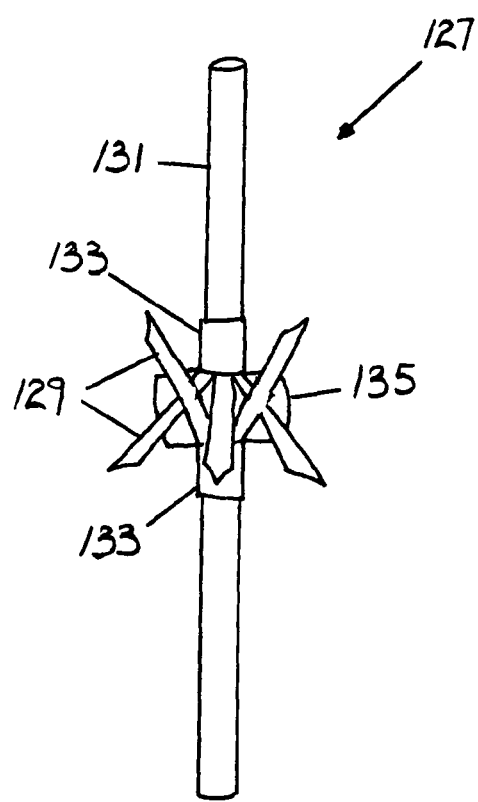
FIG. 13 is a perspective view of the device of FIG. 12 in a compressed state.

FIG. 13 is a perspective view of the device 127 of FIG. 12 in a compressed state. The spindle attachments 129 have been moved towards one another, thereby compressing the contents of the bag 135. The spindles 129 overlap, allowing for increased compression. Spindles 129 are designed to intermesh and allows for maximum overlap.

Figure 14:
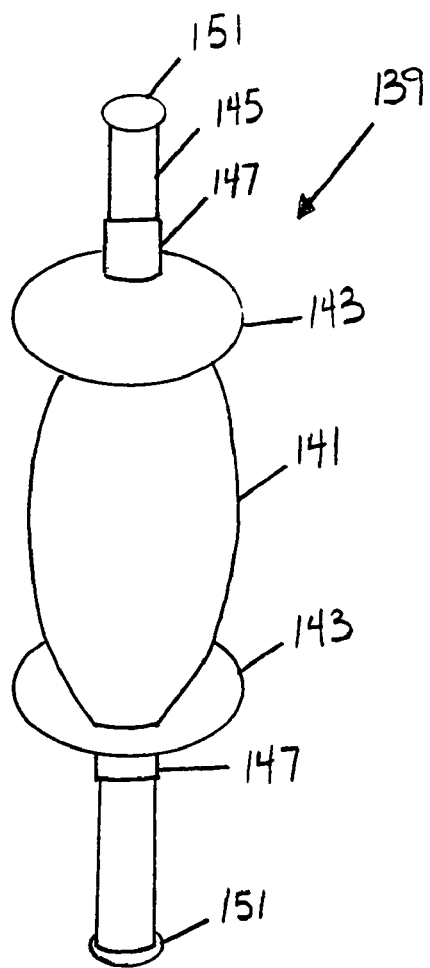
FIG. 14 is a perspective view of the device with a porous bag and movable attachments.

FIG. 14 is another preferred embodiment of a device 139 with a porous bag 141 and movable attachments 143. The attachments 143 are connected to a shaft 145 at slideable connectors 147. The bottom attachment 143 may be a cup and may be made as one unit with the shaft 145. The bag 141 is made of a porous sheet-like material, net or spindles with one or more openings to place brewing bags into the device 139. This device 139 may be disposable or non-disposable. Ends 151 may be included to hold the apparatus 139 upright when not in use. The bottom cup 143 may also serve as a stand or as a caddy for tea bags and other devices. Moving the attachments 143 towards each other along the shaft 145 performs squeezing. The bag 141 may also be fixed to the attachments 143 as well as wrapped loosely around the rod 145. Rotating the attachments 143 in opposite directions or rotating one attachment 143 while the other remains fixed may also perform squeezing. The bag 141 may be pre-filled with brewing contents or may have an opening for inserting other brewing devices.

Figure 15:
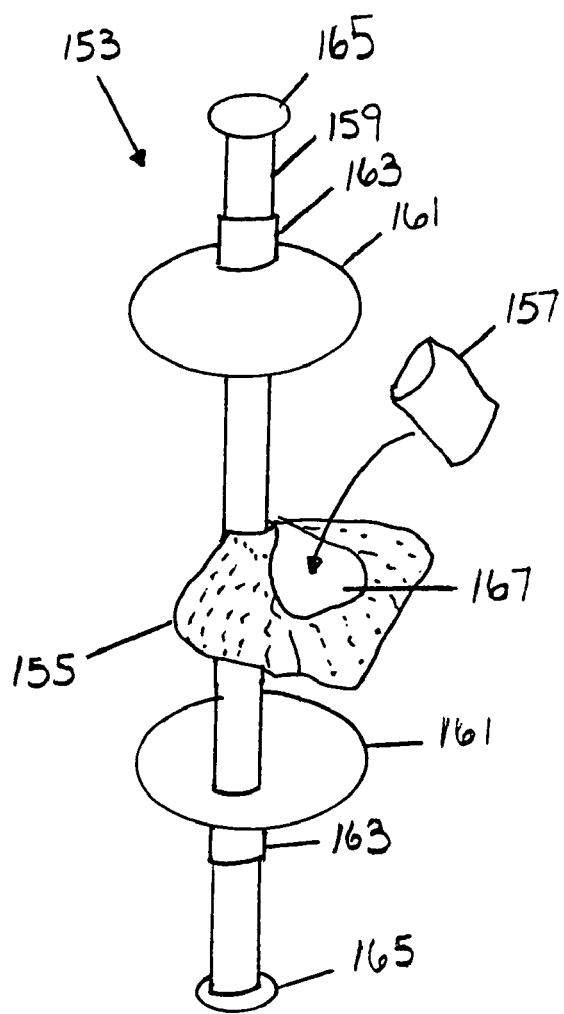
FIG. 15 is a perspective view of the device with an attachment for holding a brewing device.

FIG. 15 is another preferred embodiment of a device 153 with a basket 155 for holding a brewing device 157. The brewing device 157 may be, but is not limited to tea bags, coffee bags, or other prepackaged contents. Instead of the bag 141 in FIG. 14, a brewing device 157 not incorporated into the device 153 is inserted into the basket 155. The basket 155 may be a clip, elastic band, pocket-like basket or other similar means to attach the brewing device 157 to a rigid shaft 159. FIG. 15 shows a pocket-like basket 155 attached to the rigid shaft 159. This configuration allows the basket 155 to move along the shaft 159. Alternatively, the basket 155 may be placed against one of the rounded attachments 161. An opening 167 allows a user to insert a brewing device 157 or loose brewing contents composed by the user to suit individual taste. The rounded attachments 161 are connected to the shaft 159 by connectors 163. The connectors 163 are held in place by friction, but are capable of moving up and down the shaft 159. The rounded attachments 161 may fan out from their tubular fittings 163 into disc-like or conical structures that face each other toward the center of the shaft 159. Movement of one attachment 161 against another facilitates squeezing of the brewing device 157 within the basket 155. Moving one attachment 161 away from the other relaxes the compression and allows for reuse of the basket 155. Ends 165 prevent the attachments 161 from falling off the ends of the shaft 159.

Figure 16:
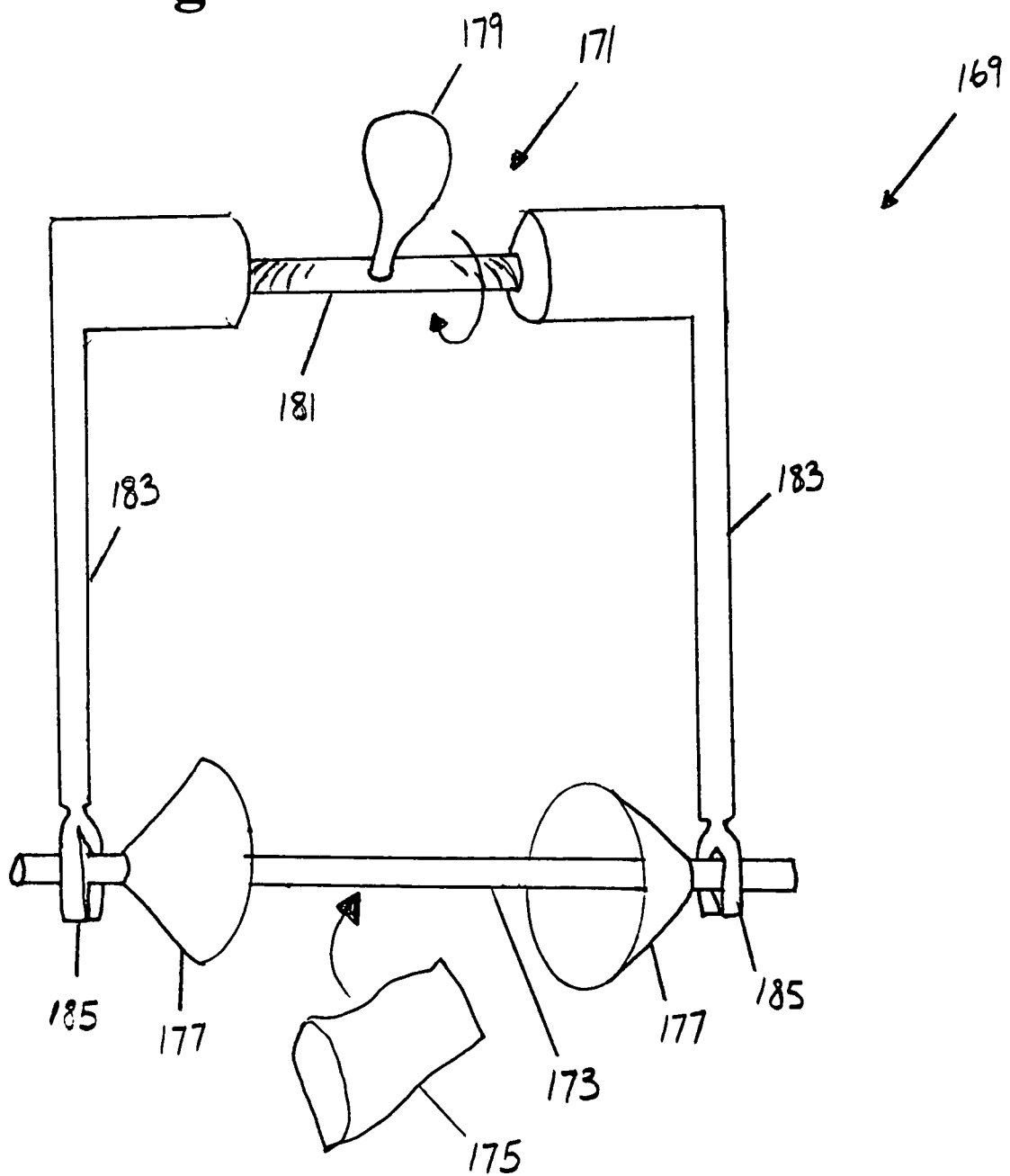
FIG. 16 is a perspective view of the device with an attached ratchet for added force.

FIG. 16 shows a device 169 with an attached ratchet 171 for added force. This device 169 may be disposable or non-disposable. An attached motor, wrench or ratchet-like structure adds force, control, fixation and precision. This embodiment is useful for squeezing fluid, moisture, water or other substances out of a material, such as the removal of water from the whey of milk. A shaft 173 supports the contents 175 that are being squeezed. Rounded attachments 177 hold the contents 175 and apply force. The ratchet 171 includes a handle 179, a threaded shaft 181, two connector halves 183 and grippers 185 for holding the slidable tubes 178 connected to the attachments 177 and that is fixed to the shaft 173 by friction. As the ratchet 171 is tightened, the grippers 185 force the slidable tubes 178 connected to the attachments 177 towards each other, compressing the contents 175.

Figure 17:
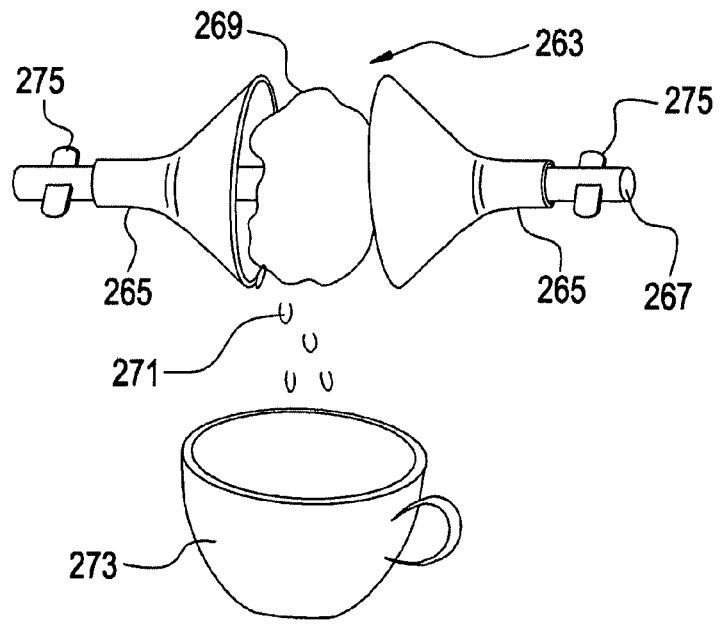
FIG. 17 is a perspective view showing the operation of the device shown in FIGS. 10-16 in a horizontal position.

FIG. 17 shows the operation of the device 263 similar to those shown in FIGS. 10-16. Slidable attachments 265 are pushed towards one another along a central shaft 267. The attachments 265 compress a brewing bag 269 and squeeze fluid 271 into a receptacle 273. FIG. 17 shows a horizontal configuration with two movable attachments 265. Stops 275 at the ends of the shaft 267 prevent the attachments 265 from falling off the shaft 267. Alternatively, the user may hold one attachment 265 with one hand and the shaft 267 with the other hand. The user then pushes the attachment 265 along the shaft, either towards or away from the hand holding the shaft 267.

Figure 18:
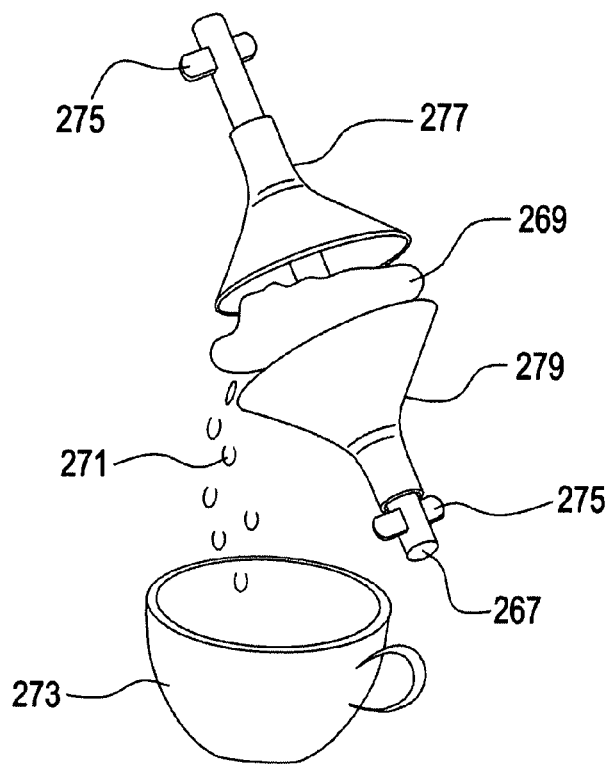
FIG. 18 is a perspective view showing the operation of the device shown in FIGS. 10-16 in a vertical position.

FIG. 18 shows the operation of the device 263 shown in FIG. 17 used in a vertical or slightly tilted position. Here, the user holds the top end of the shaft 267 with one hand and a movable attachment 277 in the opposite hand. The user pushes the movable attachment 277 towards a stationary attachment 279 to compress the brewing bag 269.

Figure 19:
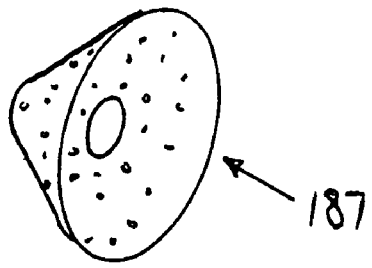
FIG. 19 is an alternative embodiment of the attachments in FIGS. 10-16 with a porous disc shape.
Figure 20:
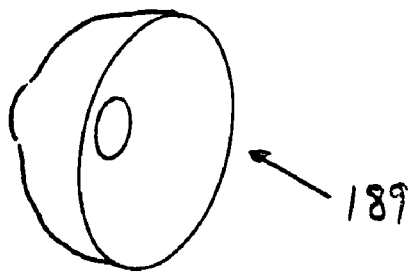
FIG. 20 is an alternative embodiment of the attachments in FIGS. 10-16 with a cup shape.
Figure 21:
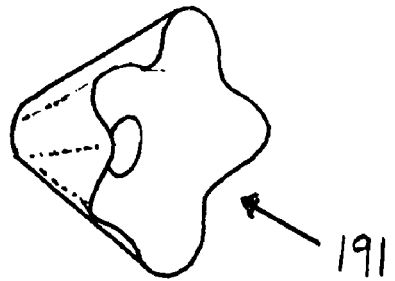
FIG. 21 is an alternative embodiment of the attachments in FIGS. 10-16 with a wave shape.
Figure 22:
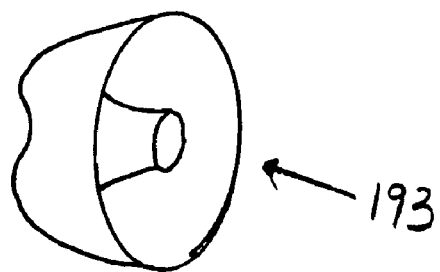
FIG. 22 is an alternative embodiment of the attachments in FIGS. 10-16 with a bunt cake mold shape.
Figure 23:
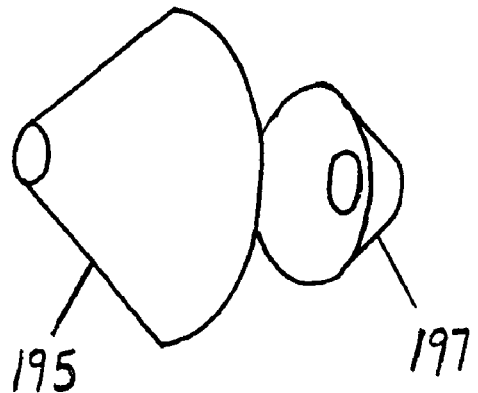
FIG. 23 is an alternative embodiment of the attachments in FIGS. 10-16 with unequal sizes.

FIGS. 19-23 shows various shapes and configurations of the attachments. Any shape attachment may be used for any embodiment of the present invention. FIG. 19 shows an attachment 187 with a porous disc shape. FIG. 20 shows an attachment 189 with a cup shape. FIG. 21 shows an attachment 191 with a wave shape. FIG. 22 shows an attachment 193 with a bunt cake mold shape. FIG. 23 shows a larger attachment 195 and a smaller attachment 197 that work together.

Figure 24:
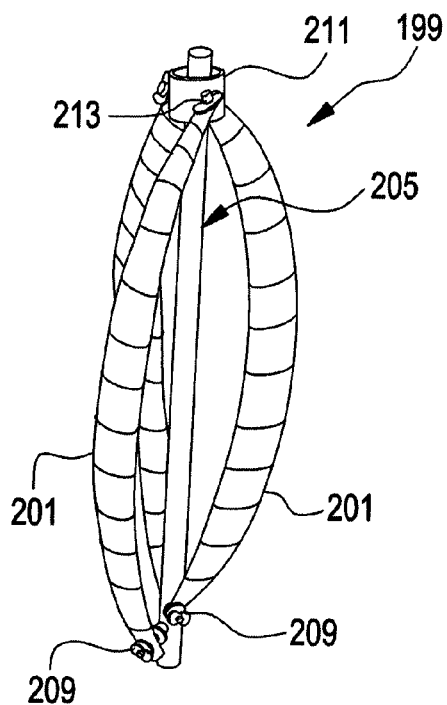
FIG. 24 is a perspective view of the device with multiple bag-like receptacles extending from an upper portion of the shaft to a lower portion.
Figure 25:
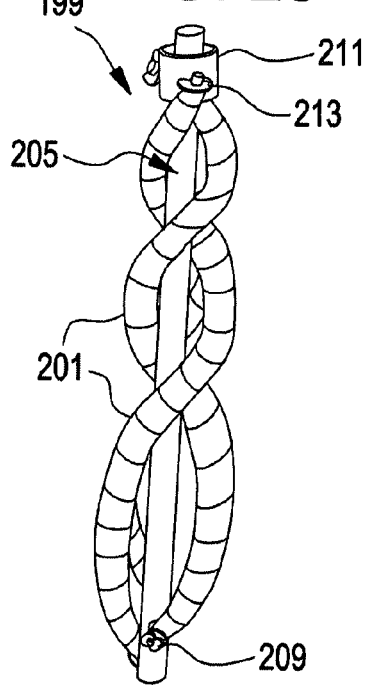
FIG. 25 is a perspective view of the embodiment of FIG. 24 in a compressed state.

FIG. 24 is another preferred embodiment of a device 199 with multiple bag-like receptacles 201 extending from a ring structure 211 at an upper portion 203 of the shaft 205 to a lower portion 207 of the shaft 205. The receptacles 201 are connected to the ring structure 211 by connectors 213. The receptacles 201 are connected to the lower portion of the shaft 205 by connectors 209. The ring structure 211 is attached to the shaft 205 by friction or other means. Rotating the ring 211 in one direction, compresses the receptacles 201 around the shaft 205 surfaces. FIG. 25 shows the receptacles 201 in a compressed state. Rotating the ring 211 in the opposite direction uncompresses the receptacles 201.

Figure 26:
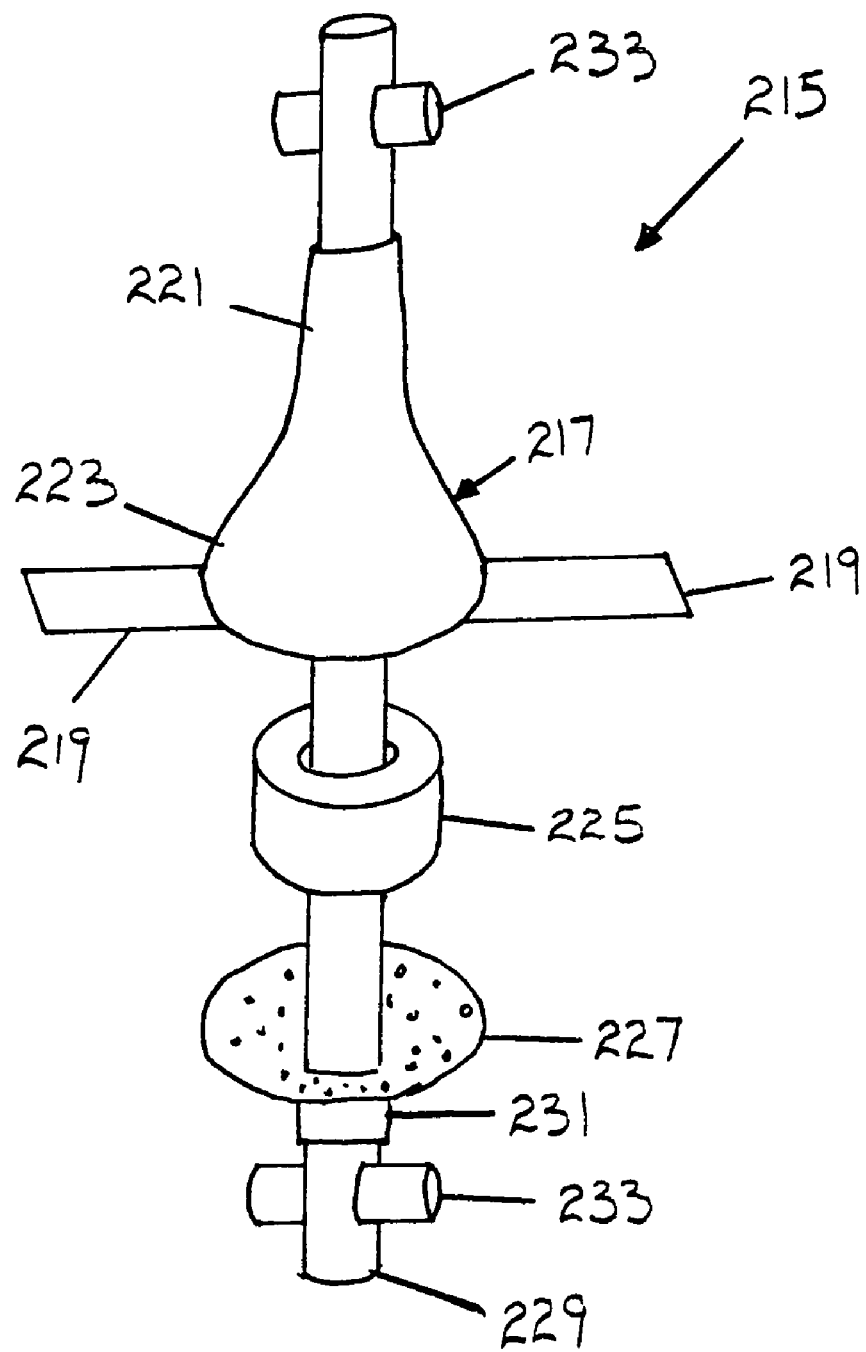
FIG. 26 is a perspective view of the device with a concave disc attachment and flaps.

FIG. 26 is another preferred embodiment showing a device 215 with an elongated concave disc attachment 217 and flaps 219. The concave disc attachment 217 has an elongated neck 221 and a bell 223. The attachment 217 may or may not have holes. The elongated neck 221 allows a user to avoid contact with liquids squeezed out of a brewing bag 225 during use. The flaps 219 extend from the bell 223 and provide another means for avoiding liquid squeezed out during use. A smaller concave disc-like attachment 227 is attached to a rigid shaft 229 at a connector 231, and may or may not have holes. The smaller attachment 227 also helps the user to avoid contact with hot liquids as it forces the contents out beneath the larger attachment that acts as a shield. The shaft 229 may have stops 233 at the top and/or bottom ends to prevent the attachments 217, 227 from falling off the shaft 229.

Figure 27:
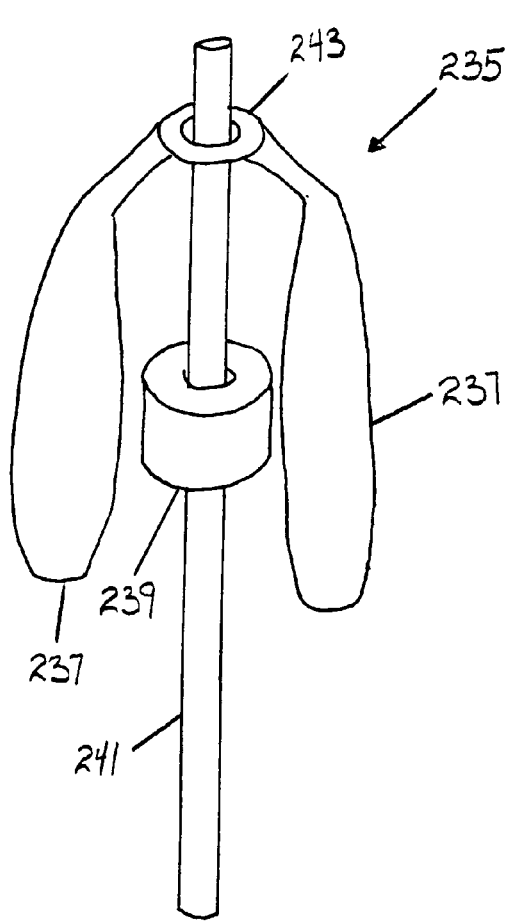
FIG. 27 is a perspective view of the device with flap formations.

FIG. 27 is another preferred embodiment of a device 235 with flaps 237. A brewing device 239 is attached to a rigid shaft 241. A ring structure 243 holds the two or more flaps 237. The user pushes the flaps 237 toward the shaft 241 to squeeze liquid out of the brewing device 239. The flaps 237 may have more than one segment and are somewhat rigid.

Figure 28:
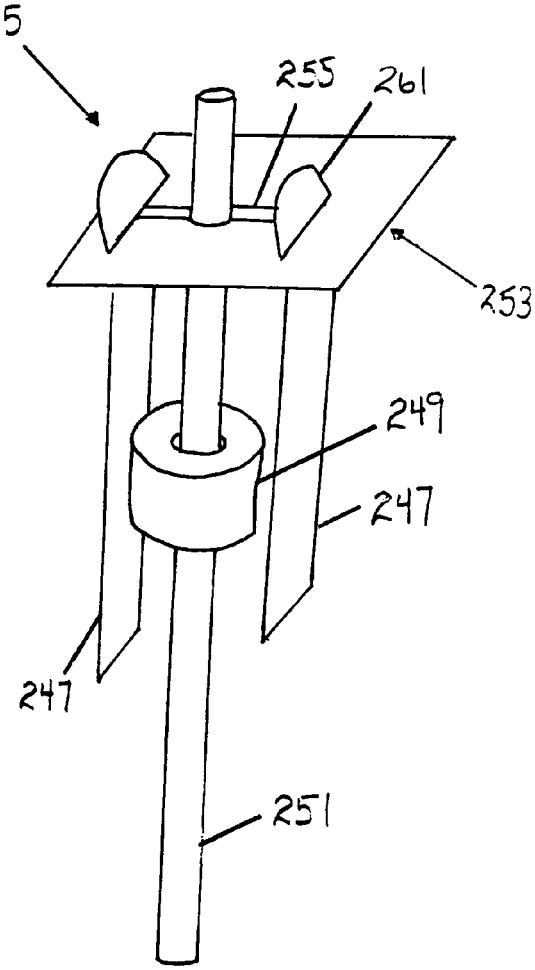
FIG. 28 is a perspective view of the device with a grooved panel and flaps.
Figure 29:
FIG. 29 is a detail of the flap.

FIG. 28 is another preferred embodiment of a device 245 with flaps 247. A brewing device 249 is attached to a rigid shaft 251. A grooved panel 253 is attached to the rigid shaft 251. Grooves 255 allow the flaps 247 to slide into place. FIG. 29 is a detail of the flap 247. The flap 247 includes a body 257, a neck 259, and a head 261. The head 261 of the flap 247 is slid into a groove 255 until the neck 259 is in the same plane as the panel 253. The flap 247 is then rotated ninety degrees and slid away from the shaft 251, locking the flap 247 onto the panel 253. Force is applied to the head 261 away from the shaft 251 to move the body 257 towards the brewing device 249. Liquids are squeezed from the brewing device 249. Pressure is relaxed and the brewing device 249 may be reused.

Figure 30:
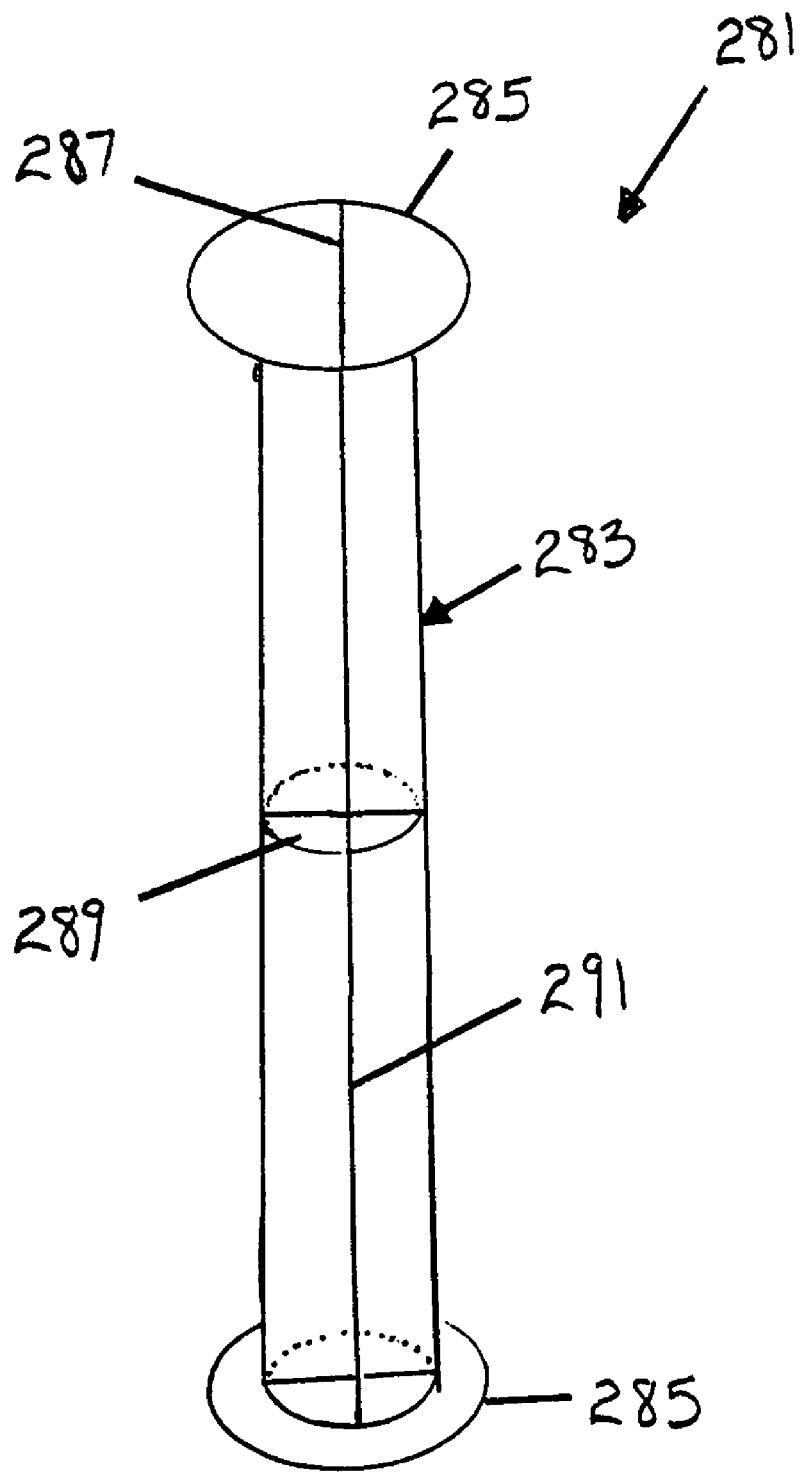
FIG. 30 is a perspective view of a stirrer and dispenser apparatus only.

FIG. 30 is another preferred embodiment of a stirrer and dispenser 281 that is useful for both hot and cold drinks. This device 281 includes a rigid hollow shaft 283 with plugs 285 on one or both ends of the shaft 283. The plugs 285 may be divided 287. There may be one or more horizontal partitions 289 dividing the shaft 283 into compartments for containing various items for dispensing. There may also be vertical partitions 291. Dispensable items may include, but are not limited to, flavorings for hot or cold beverages, and ingredients for adding to water, milk, alcohol, juices, punches, or other base liquid substances to create a drink or to add to a drink. As an example, alcohol may be dispensed into a beverage, such as coffee or tea. The dispensed items may be flavorings, sweeteners, creamers, condiments, spices, herbs, medicinal substances, vitamins, minerals, or other legally mind altering substances, such as nicotine-based substances. The use of nicotine-based substances allows for an alternative oral administration of nicotine for users to quit smoking or prevent the spread of secondhand smoke in the home and in public. The use of this device for medicinal substances may also increase the chances of medicinal compliance. This device may be produced in non-disposable forms as well as disposable forms. This embodiment may be used alone or as part of the other embodiments of this invention that include the ability to act as squeezers and brewers as well.

In addition to the devices of the present invention being biodegradable and disposable, each of the devices may be formulated to be edible in part or as a whole.

Figure 31:
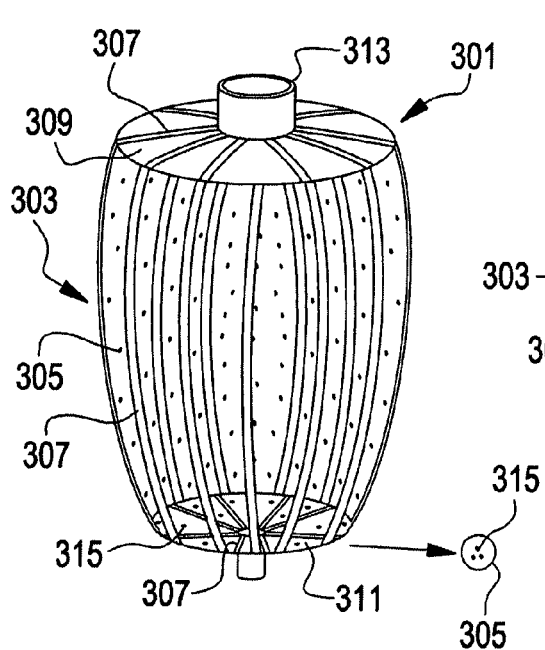
FIG. 31 is an alternative embodiment with a solid piece of plastic with pores for forming a porous film of plastic material with ribbing.

FIG. 31 is an alternative embodiment 301 with a solid piece of plastic 303 with pores 305 for forming a porous film of plastic material with ribbing 307. The ribbing 307 adds structure and control. The device 301 is capped with ribbed and thickened cup-like portions 309, 311 that fan out, contract and have some rigidity during use. The cup-like portions 309, 311 have central holes 313 for placement of a stirring rod 317. The top cup-like portion 309 is not porous. The bottom cup-like portion 311 may have larger holes 315 than the holes 305 on the porous film 303. The porous film 303 holds tea leaves or coffee grounds and keeps dust inside the porous film 303. Water is allowed to penetrate and flow through the porous film 303. The bottom cup 311 may serve as a stand or as a caddy for a tea bag or similar device.

Figure 32:
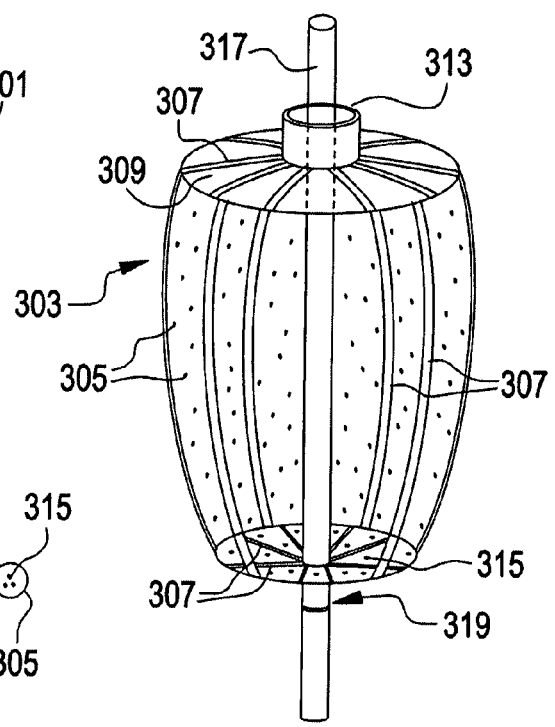
FIG. 32 shows the embodiment of FIG. 31 with a stirring rod inserted into the central holes.

FIG. 32 shows the embodiment of FIG. 31 with a stirring rod 317 inserted into the central holes 313. Heat or another device fixes the bottom 319 of the bottom cup-like portion 311 onto the stirring rod 317 and may make the bottom cup as one unit with the stirring rod. The ribbing 307 supports the device 301 in a more distended position.

Figure 33:
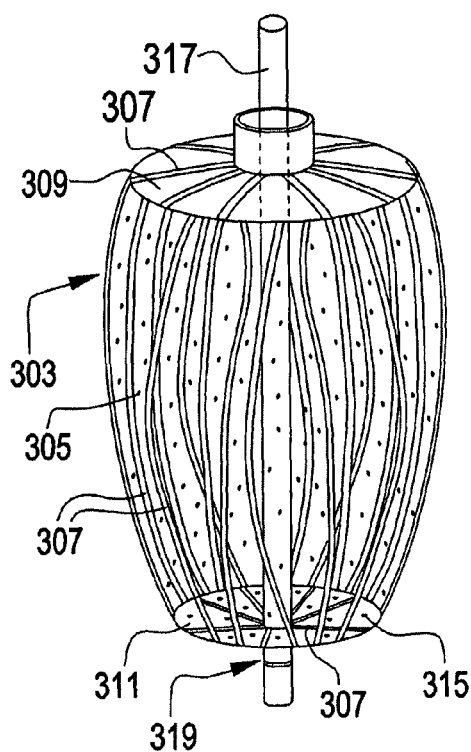
FIG. 33 shows the embodiment of FIG. 31 and FIG. 32 in a more spiral or angular configuration to facilitate use.

FIG. 33 shows the embodiment of FIG. 31 and FIG. 32 in a more spiral or angular configuration to facilitate use.

Figure 34:
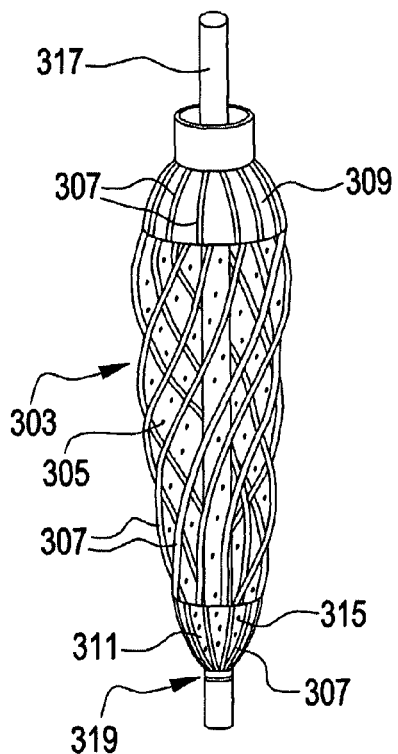
FIG. 34 shows the embodiment of FIG. 33 being squeezed around the stirring rod due to turning of the top cup-like portion against the fixed position of the bottom cup-like portion.

FIG. 34 shows the embodiment of FIG. 33 being squeezed around the stirring rod 317 due to turning of the top cup-like portion 309 against the fixed position of the bottom cup-like portion 311. Twisting is facilitated by angular structures of the ribbing 307 and fan like flexible cups 309, 311.

Figure 35:
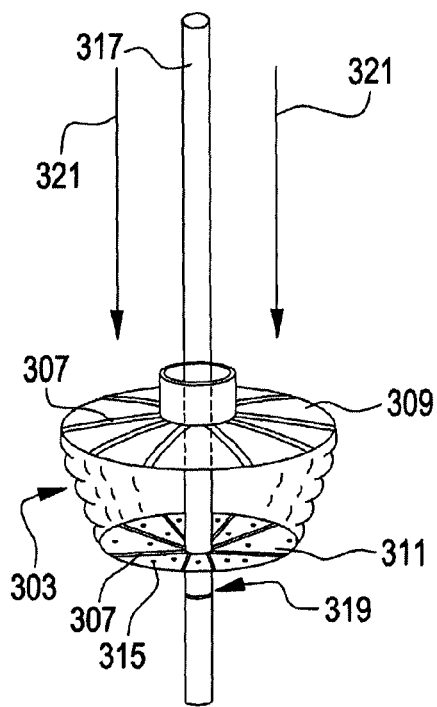
FIG. 35 shows the embodiment of FIG. 33 with compression force applied to the top cup-like portion downward against the fixed bottom cup-like portion.

FIG. 35 shows the embodiment of FIG. 33 with compression force 321 applied to the to cup-like portion 309 downward against the fixed bottom cup-like portion 311. The porous film 303 central section fits within the cup-like portions 309, 311. A greater overall thickness of the cup-like portions 309, 311 helps facilitate the porous film 303 to compress into the cup-like portions 309, 311.

Figure 36:
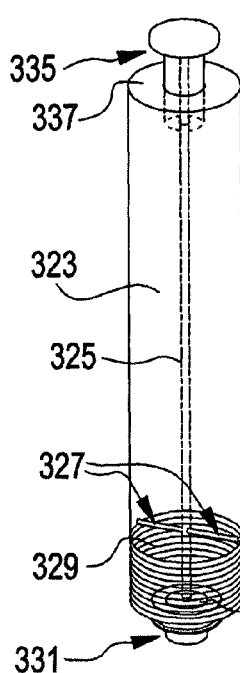
FIGS. 36 and 37 are detailed cutaway views of the stirring rod.
Figure 37:
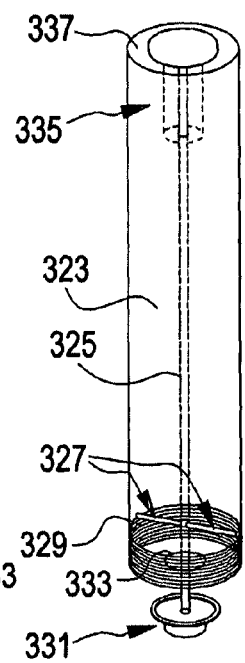

FIGS. 36 and 37 are detailed cutaway views of the stirring rod 317. A hollow shaft 323 may contain creamer, sweetener, or other flavorings. A small rod 325 is located inside the hollow shaft 323. Projections 327 from the small rod 325 depress a spring 329 when they are pressed downward. The spring 329 pushes up on and pulls a disc structure 331 upward to close an opening 333. The disc structure 331 may have a weighted protrusion for adding weight to the overall device to keep the buoyant bag 303 from floating. The opening 333 allows contents of the hollow shaft 323 to dispense when the small rod 325 is moved downward. The downward movement causes the projections 327 to move downward and compress the spring 329, thus moving the disc structure 331 away from the opening 333. A button covering 335 allows a user to press downward on the small rod 325. A closure 337 encircles the area of insertion of the button covering 335 on the top of the hollow shaft 323.

Figure 38:
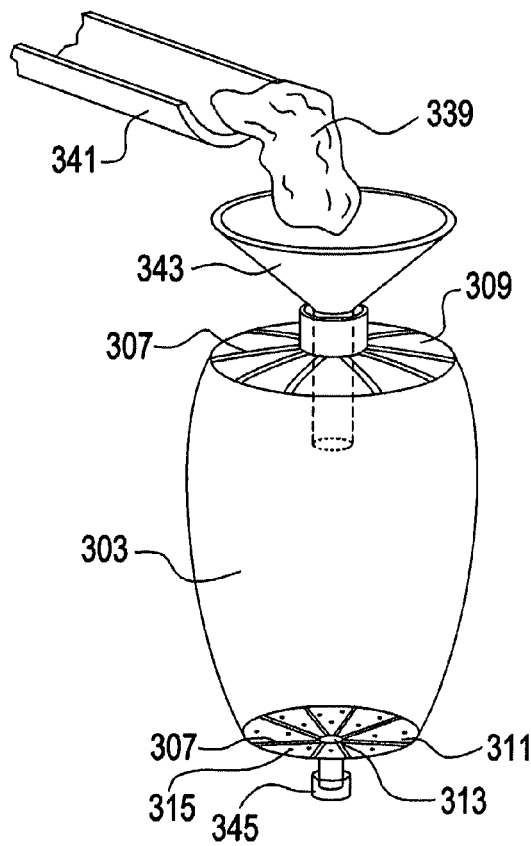
FIG. 38 shows a method of filling bags with tea leaves or coffee grounds.

FIG. 38 shows a method of filling bags 303 with tea leaves or coffee grounds 339. A shoot 341 flows the tea leaves or coffee grounds into the bags 303 via a funnel 343. A plug and holding device 345 prevents tea leaves or coffee grounds from pouring out of the bottom opening 313.

Figure 39:
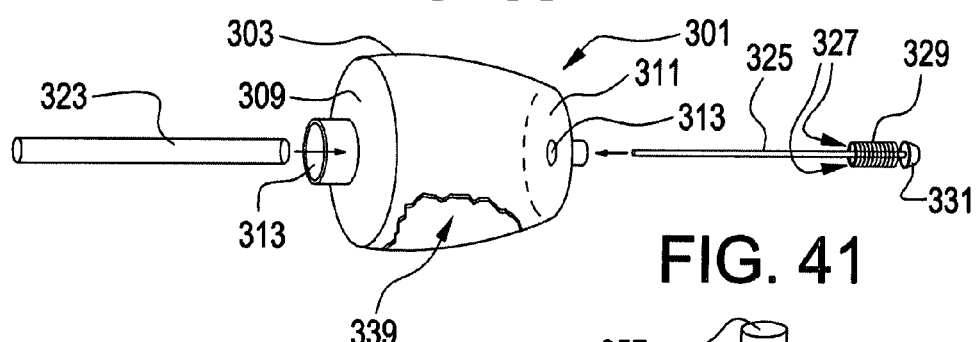
FIG. 39 shows the device tilted horizontally from a vertical position after filling with tea leaves or coffee grounds.

FIG. 39 shows the device 301 tilted horizontally from a vertical position after filling with tea leaves or coffee grounds 339. The tea leaves or coffee grounds 339 move to one side of the bag 303. This frees the holes 313 in the cup-like portions 309, 311 for insertion of the stirring rod 317 away from the tea leaves or coffee grounds 339. As the hollow shaft 323 is inserted into the opening 313 on the top cup-like portion 309, the small rod 325, projections 327, spring 329 and disc structure 331 are inserted into the opening 313 in the bottom cup-like portion 311 and the two parts are joined together.

Figure 40:
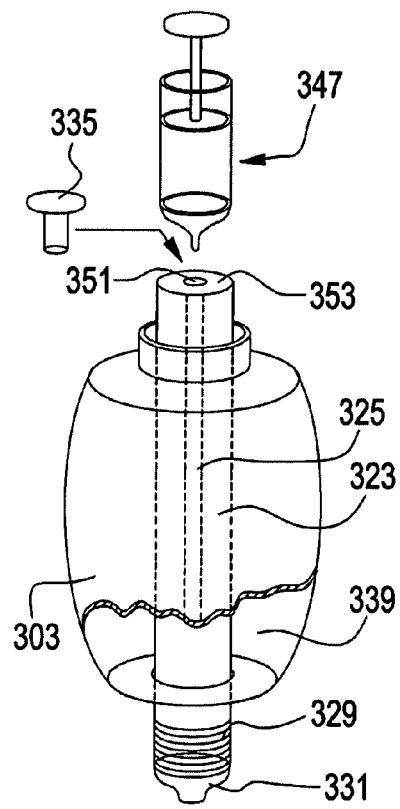
FIG. 40 shows a syringe or other device for injecting cream, sweetener or other flavorings into the hollow shaft through a hole.

FIG. 40 shows a syringe or other device 347 for injecting cream, sweetener or other flavorings into the hollow shaft 323 through a hole 349. After injection, the button covering 335 is inserted into an opening 351 in the top 353 of the hollow shaft 323.

Figure 41:
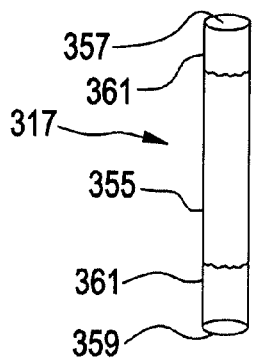
FIG. 41 is an alternative embodiment of the stirring rod.

FIG. 41 is an alternative embodiment of the stirring rod 317. The stirring rod 317 is a hollow rod 355 that may be filled with desired ingredients and capped at both ends 357, 359 with removable foil 361 and blown out from the top end 357 by the user. A simple peel off method for the foil 361 is used.

Likewise, the ends may be capped by a substance that will dissolve in water while in use, or be sealed by a pinch closure that can be popped open by pressure. A number of methods may be applied for sealing and opening the stirring rod to release its contents. The stirring rod itself may operate like a syringe to dispense contents.

Figure 42:
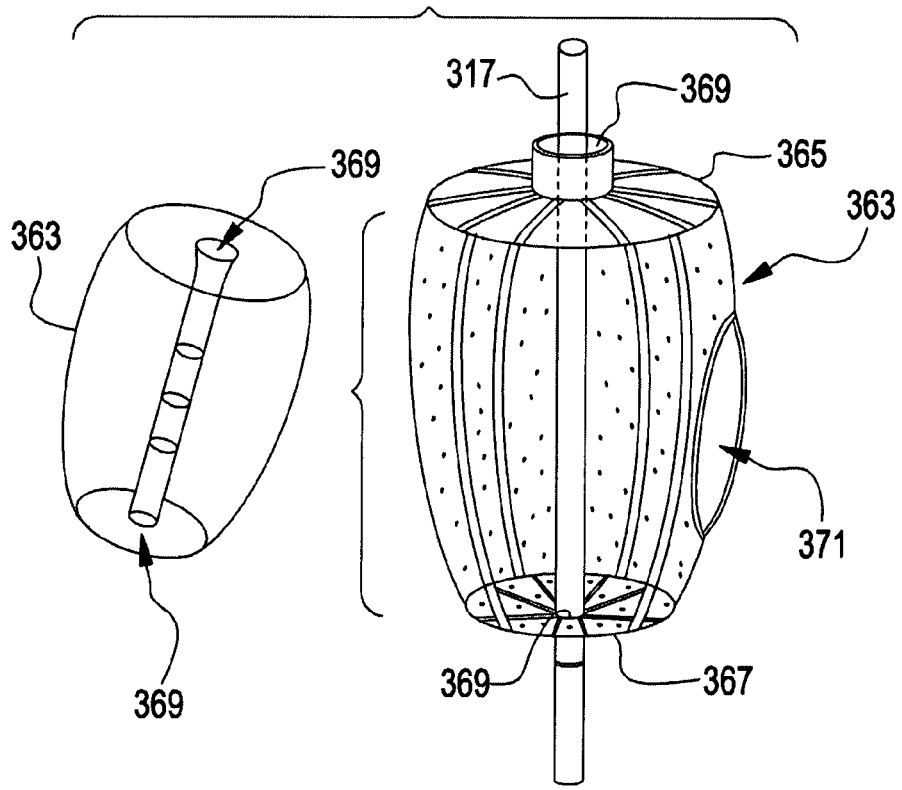
FIG. 42 is an alternative embodiment of the device shown in FIG. 31.

FIG. 42 is an alternative embodiment of the device 301 shown in FIG. 31. A solid piece of plastic includes a porous plastic film 363 forming a completely enclosed structure wrapped around the stirring rod 317. The porous plastic film 363 is not open to holes in its top and bottom. The film 363 is attached to the thickened cups 365, 367 at the top and bottom that have holes 369 through which the rod 317 is inserted and fixed at the bottom end. Tea leaves or coffee grounds are poured through an opening 371 on the side that is then heat sealed or sealed with some other device. This configuration prevents spillage of the tea leaves or coffee grounds.

Figure 43:
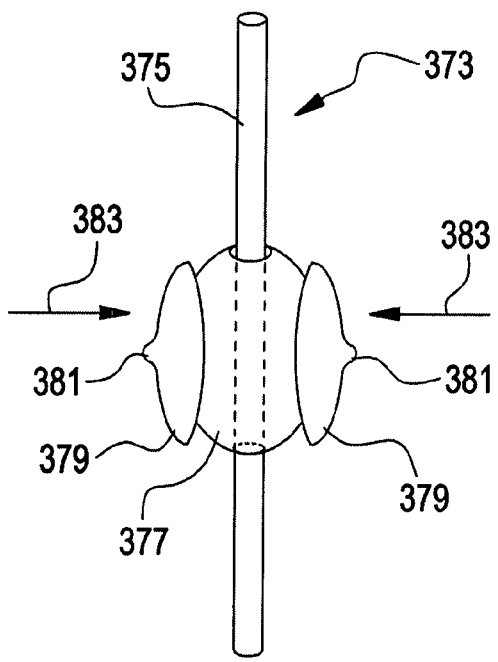
FIG. 43 shows an alternative device with panels in a brewing bag attached to a stirring rod in a relaxed position.

FIG. 43 shows a device 373 in a relaxed position. A stirrer 375 is a rod or a straw on which a bag 377 is attached. Pad like devices 379 or other similar devices are attached to, enclosed within or part of the fabric of the bag 377. The pad like devices 379 are placed in opposing positions with respect to one another. Protrusions, raised or indented surfaces 381 are provided for a user's fingers. Force 383 is exerted by a user's fingers on the protrusions 381 to squeeze the device 373.

Figure 44:
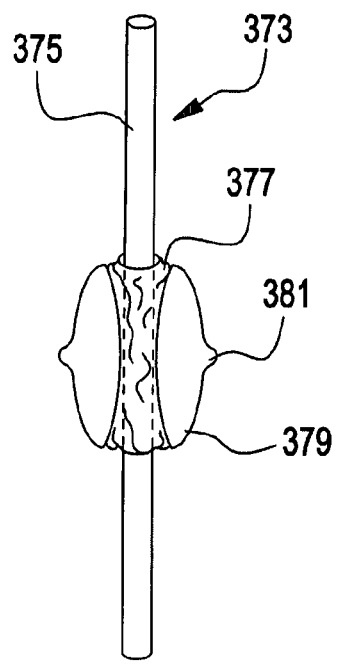
FIG. 44 shows the device in FIG. 43 in a squeezed position.

FIG. 44 shows a device 373 in a squeezed position.

Figure 45:
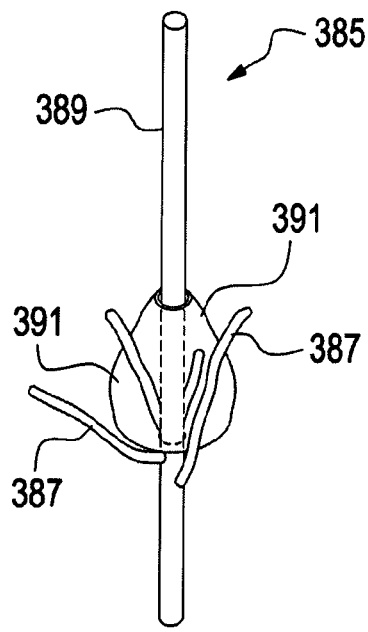
FIG. 45 is a stirrer made of wooden sticks or bamboo shoots or any other suitable material with brewing bag attached.

FIG. 45 is a stirrer 385 made of for example, but not limited to, wooden sticks or bamboo shoots or any other suitable material. A bag 391 is attached to the stirrer 385. Protrusions 387 from the stirrer 385 are created by molding if the stirrer 385 is plastic, carved out of the wood or bamboo, or otherwise attached to the stirrer shaft 389. The protrusions 387 hold and support the bag 391. In some preferred embodiments, the protrusions 387 may enclose and squeeze the bag 391 manually, with a string or some other device.

Figure 46:
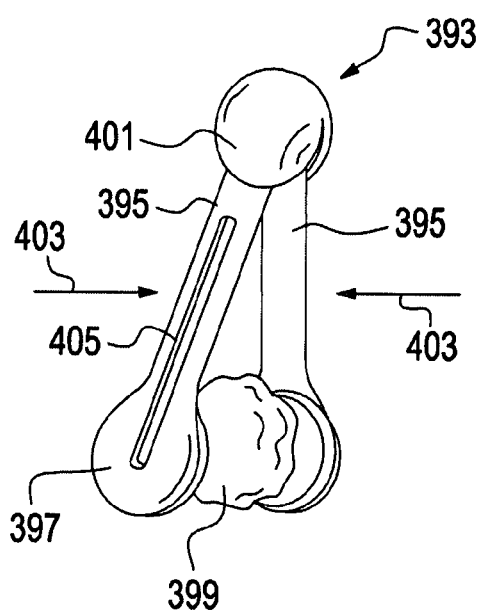
FIG. 46 is an alternative embodiment of a device with extended panels hinged at one end.

FIG. 46 is an alternative embodiment of a device 393 with extended panels 395 hinged at one end 401. A bag 399 is attached to the extended panels 395 at ends 397 opposite to the hinged end 401. A user exerts force 403 to squeeze the extended panels 395 together and thus squeeze the bag 399. In preferred embodiments, a straw or other device 405 is incorporated for dispensing other flavorings.

Figure 47:
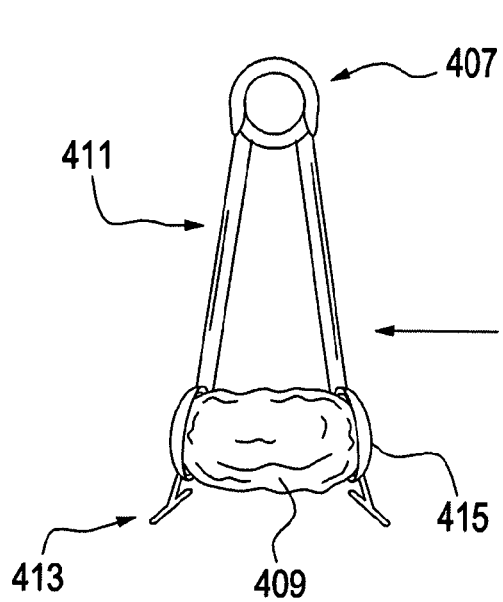
FIG. 47 is a device with a bag attached between tongs anywhere along the length of the tongs.

FIG. 47 is a device 407 with a bag 409 attached between tongs 411 anywhere along the length of the tongs 411. Compressing the tongs 411 squeezes the bag 409. The bag 409 may be held in place by clasps 413 at bottom ends 415 of the tongs 411. The bag 409 may come in a variety of formats, including, but not limited to, a quilted format.

Figure 48:
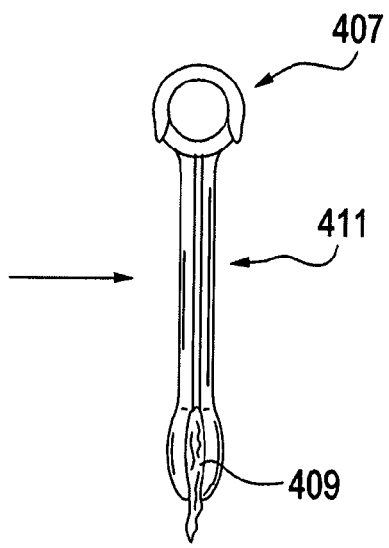
FIG. 48 shows the device of FIG. 47 in a compressed position.

FIG. 48 shows the device 407 of FIG. 47 in a compressed position.

Figure 49:
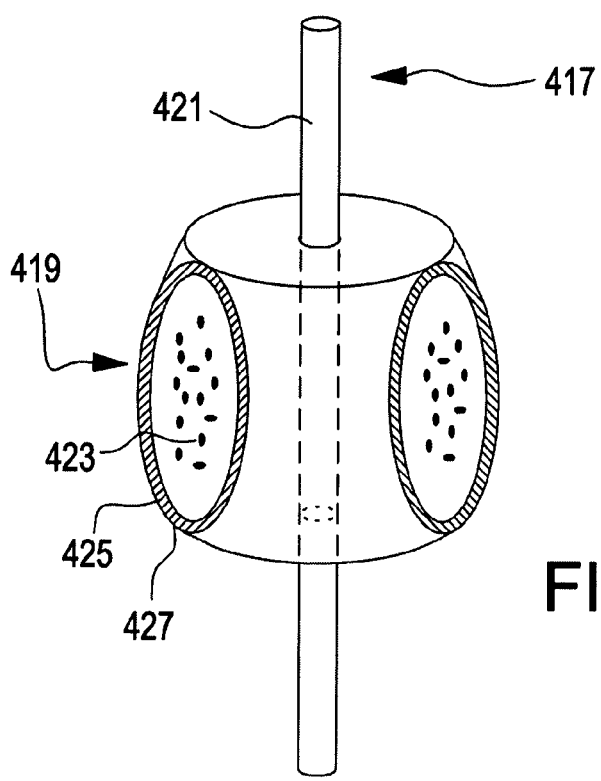
FIG. 49 shows an alternative device with a bag attached to a stirrer.

FIG. 49 shows an alternative device 417. A bag 419 is attached to a stirrer 421. The bag 419 may be vacuum-sealed. Tea leaves or coffee grounds 423 are enclosed within the bag 419. The bag 419 is made of batting type or fibrous material 425 lined on both sides by finely porous mesh 427 to facilitate percolation of hot water while maintaining containment of the materials 423.

Figure 50:
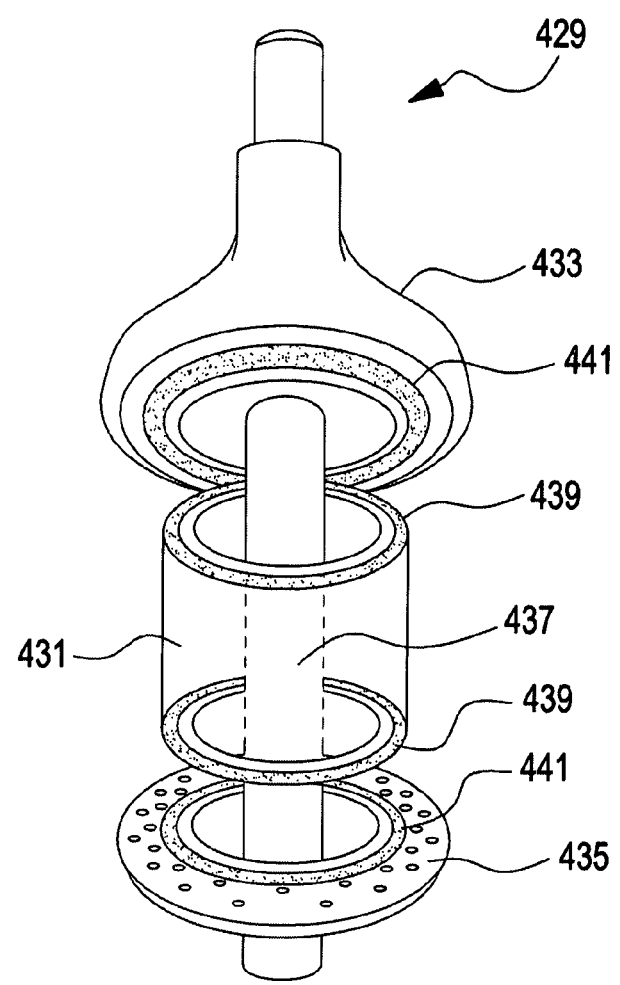
FIG. 50 shows an alternative device with the bag attached to moveable attachments by rings inserted into grooves in the attachments.

FIG. 50 shows an alternative device 429 with brewing bag 431 fitted with rings 439 that fit into grooves 441 in moveable attachments 433 and 435. This fixation allows for squeezing of the brewing bag 431 by rotation of the moveable attachments in opposite directions with respect to one another or by rotation of the top attachment while the bottom attachment remains fixed. This rotation is in a plane perpendicular to a stirring rod 437. The brewing bag may also be squeezed by moving the attachments 433 and 435 towards one another along the stirring rod 437 or if one attachment 435 is fixed, by moving attachment 433 toward attachment 435. In this design the top attachment 433 is a larger funnel like shape with no holes to protect the user's hands from liquids. The bottom attachment 435 is a similar attachment with holes and is smaller than the top attachment 433. The brewing bag 431 may also be attached to movable attachments 433 and 435 by sewing, gluing, stapling, or other means.

Figure 51:
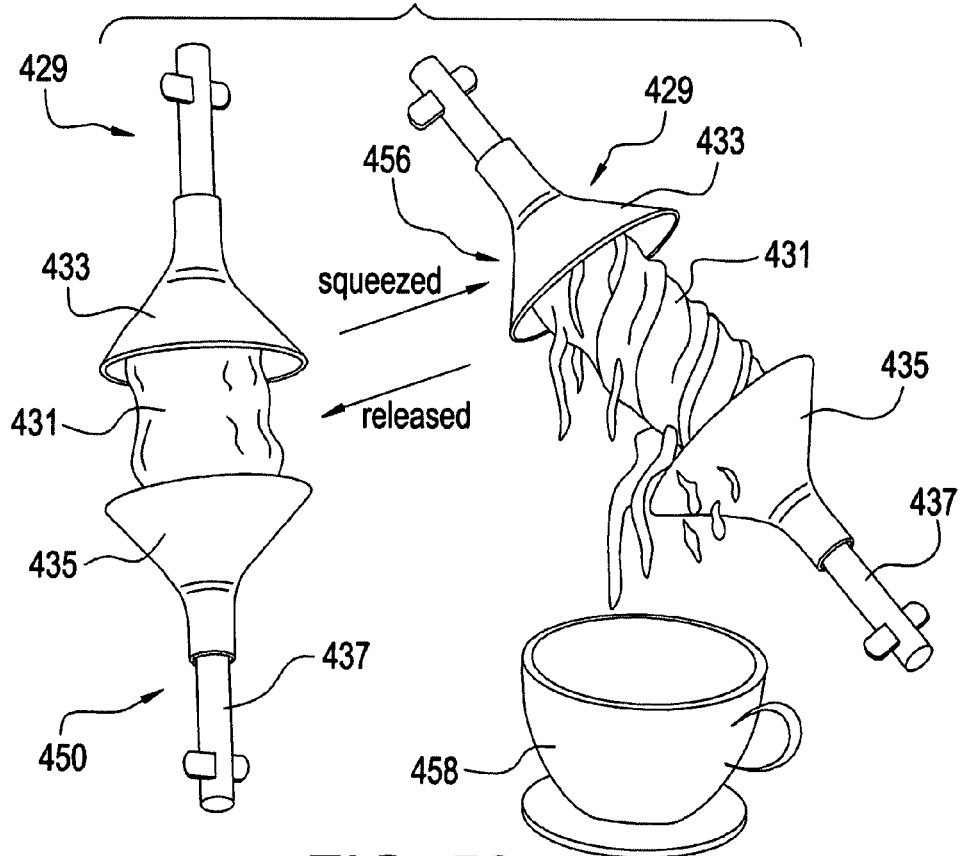
FIG. 51 shows the device in FIG. 50 in the relaxed and the compressed state.

FIG. 51 shows the device 429 of FIG. 50 in a relaxed state 450 and a compressed state 456. The compressed state 456 is achieved by twisting the bag 431 around the stirring rod 437 by rotating the top attachment 433 in a plane perpendicular to the axis of the stirring rod 437. The bag 431 is twisted against a fixed attachment 435 or in the opposite direction of rotation of the bottom attachment 435. This motion squeezes brewed contents from the bag 431 into a cup 458. The bag 431 may also be compressed by sliding the attachments 433, 435 towards one another along the stirring rod 437 or by sliding the top attachment 433 down the stirring rod 437 toward the bottom attachment 435.

Figure 52:
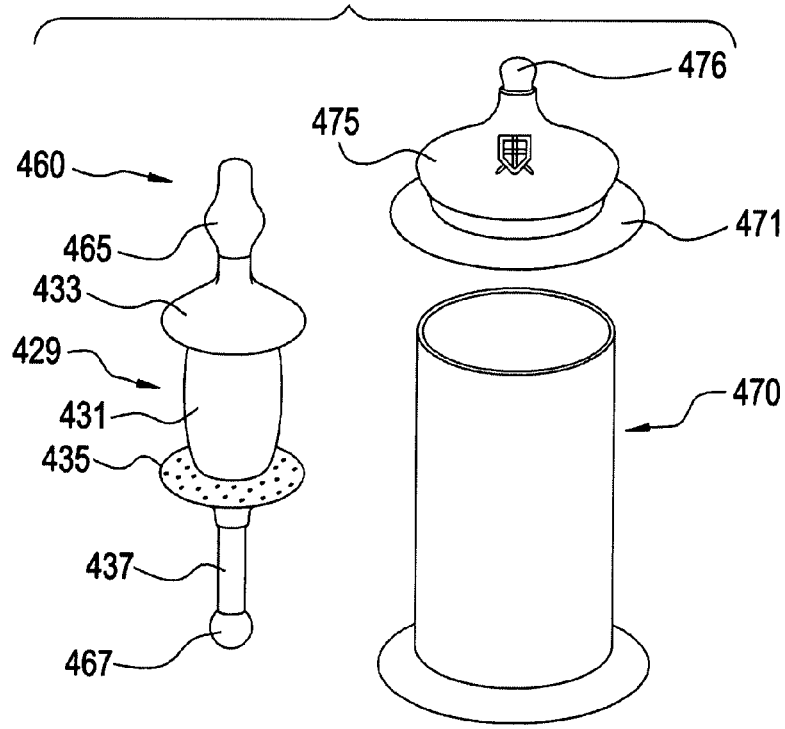
FIG. 52 shows modifications of the stirring part of the device and the cap of a container for the device to hold substances.

FIG. 52 shows a modification 460 of the device shown in FIGS. 50 and 51 where the stirrer 437 is hollow and ballooned out at a top location 465 of the stirrer 437 to hold larger amounts of a desired substance. A removable base cap 467 releases desired substances from the stirrer 437 into a brewed drink. The removable base cap 467 may be weighted to cause the buoyant bag device 460 to sink into the liquid. A container 470 may hold the device 460 and comes with cap 471 that may be a bottle like container 475 with a cap 476 for holding ingredients to add to the brewed drinks.

While the invention has been described with reference to specific embodiments, modifications and variations of the invention may be constructed without departing from the scope of the invention.

We claim:

1. A beverage apparatus comprising:
   a rigid rod,
   a first manipulator connected to the rigid rod near a top end of the rigid rod,
   a second manipulator connected to the rigid rod near a bottom end of the rigid rod,
   a porous material between the first manipulator and second manipulator for forming an enclosure,
   beverage brewing contents within the enclosure,
   wherein twisting, compressing the first manipulator towards the second manipulator or pulling the first manipulator away from the second manipulator expels water from the enclosure,
   wherein the second manipulator is a bottom cup and is made as one unit with the rigid rod.

2. A beverage apparatus comprising:
   a rigid rod,
   a first manipulator connected to the rigid rod near a top end of the rigid rod,
   a second manipulator connected to the rigid rod near a bottom end of the rigid rod,
   a porous material between the first manipulator and second manipulator for forming an enclosure,
   beverage brewing contents within the enclosure,
   wherein twisting, compressing the first manipulator towards the second manipulator or pulling the first manipulator away from the second manipulator expels water from the enclosure,
   wherein the second manipulator is a bottom cup and serves as a stand.

3. A beverage apparatus comprising:
a rigid rod,
a first manipulator connected to the rigid rod near a top end of the rigid rod,
a second manipulator connected to the rigid rod near a bottom end of the rigid rod,
a porous material between the first manipulator and second manipulator for forming an enclosure,
beverage brewing contents within the enclosure,
wherein twisting, compressing the first manipulator towards the second manipulator or pulling the first manipulator away from the second manipulator expels water from the enclosure,
wherein the second manipulator is a bottom cup and serves as a caddy for a tea bag.

* * * * *